March 19, 1968 D. MUIR III 3,374,468

SHIFT AND ROTATE CIRCUIT FOR A DATA PROCESSOR

Filed Aug. 10, 1965 11 Sheets-Sheet 1

INVENTOR
D. MUIR III
BY M. I. Rackman
ATTORNEY

FIG. 3A
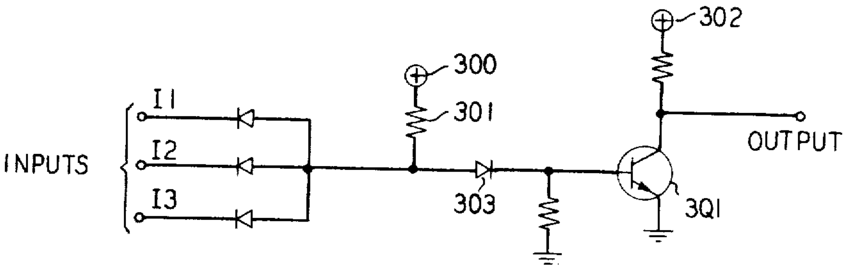
FIG. 3B
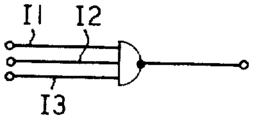
FIG. 3C
| I1 | I2 | I3 | OUTPUT |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |
FIG. 12
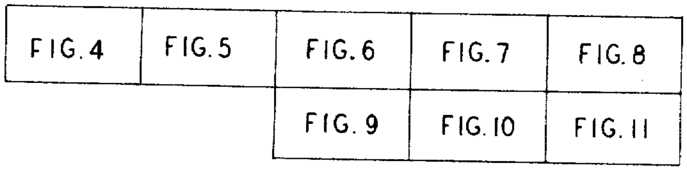

SHIFT AND ROTATE CIRCUIT FOR A DATA PROCESSOR

Filed Aug. 10, 1965 11 Sheets-Sheet 4

March 19, 1968 D. MUIR III 3,374,468

SHIFT AND ROTATE CIRCUIT FOR A DATA PROCESSOR

Filed Aug. 10, 1965 11 Sheets-Sheet 5

March 19, 1968 D. MUIR III 3,374,468

SHIFT AND ROTATE CIRCUIT FOR A DATA PROCESSOR

Filed Aug. 10, 1965 11 Sheets-Sheet 6

March 19, 1968 D. MUIR III 3,374,468

SHIFT AND ROTATE CIRCUIT FOR A DATA PROCESSOR

Filed Aug. 10, 1965 11 Sheets-Sheet 10

March 19, 1968 D. MUIR III 3,374,468

SHIFT AND ROTATE CIRCUIT FOR A DATA PROCESSOR

Filed Aug. 10, 1965 11 Sheets-Sheet 11

United States Patent Office 3,374,468

Patented Mar. 19, 1968

3,374,468
SHIFT AND ROTATE CIRCUIT FOR A DATA PROCESSOR

David Muir III, Minerva Park, Ohio, assignor to Bell Telephone Laboratories, Incorporated, New York, N.Y., a corporation of New York Continuation-in-part of application Ser. No. 420,566, Dec. 23, 1964. This application Aug. 10, 1965, Ser. No. 478,536
16 Claims. (Cl. 340—172.5)

ABSTRACT OF THE DISCLOSURE

An arrangement which performs shift and rotate operations in either direction on data stored in a register. A plurality of multi-element rotate circuits are connected in parallel between the input and output terminals of the register. Each rotate circuit is oriented to rotate the bits contained in the register stages by a predetermined different number of stages in the same one direction. Specified shift and rotate operations are performed in accordance with specified magnitudes and directions by controlling selected elements of the rotate circuits during additive sequential energization thereof to inhibit transmission of bits through the selected rotate elements.

This application is a continuation-in-part of my copending application Ser. No. 420,566, filed Dec. 23, 1964.

This invention relates to data processors and more particularly to shift and rotate circuits for use therein.

In many data processing systems it is necessary to shift and rotate data words. In conventional prior art data processors a word is first placed in one of the system registers. The word is then shifted or rotated, to the left or the right. Although the term "shifting" is used throughout this specification in its generic sense as including the rotate operation, a shift operation is distinct from a rotate operation. When the bits in the data word are shifted out of one of the ends of the register during a rotate operation they are reinserted at the other end of the register. When the word is to be shifted rather than rotated the bits shifted out of the register are not reinserted at the other end, and 0's are written in the stages at this other end of the register. Since the data word may be shifted or rotated to the right or the left it is apparent that four distinct operations are possible. The magnitude of the shift in each case must be specified.

In prior art shift and rotate circuits it has generally been required to provide a first mechanism for rotating a data word to the right and a second mechanism for rotating a data word to the left. Shifts in either direction are accomplished by blocking the bits shifted out of one end of the register. The left rotation circuitry is usually identical to the right rotation circuitry except that the various connections are made in the opposite direction. Heretofore, it has been believed that a unidirectional rotate circuit could not be used to readily accomplish shifts and rotations in both directions.

It is a general object of this invention to provide shift and rotate capabilities in either direction by the use of unidirectional rotate circuitry.

In the illustrative embodiment of my invention the principles of the invention are applied to the type of shift and rotate circuit disclosed in the copending application of W. B. Cagle et al., Ser. No. 380,274, filed July 6, 1964, now U.S. Patent 3,350,692, issued Oct. 31, 1967. In the Cagle et al., system the bits in the register may be shifted 1, 4, 7 or 8 positions in any single step. Thus, for example, a gating path is provided from each stage to the stage four positions to the right and if all of these gating paths are operated together the entire data word is rotated four positions to the right in a single step. The other three sets of gating paths control the shifting of the data word 1, 7 and 8 positions to the right, respectively. In the Cagle et al. system instead of providing only one set of gates for shifting the data bits one position at a time, an additional three sets of gates are also provided. Although the circuitry is more complex, a shift or rotate operation can be executed very rapidly. For example, a shift of 19 positions to the right may be accomplished in only three steps by operating in succession the three sets of gates which control the shifting of bits 7, 8 and 4 positions, respectively.

Although the Cagle et al. system enables a data word to be shifted or rotated rapidly, the four sets of gates which control right shift and rotate operations are duplicated to control left shift and rotate operations. In accordance with the principles of my invention the duplicated gates in the left direction are not required since the right rotation circuitry may be used to accomplish all four types of shift operations. In the illustrative embodiment of my invention five sets of gates are provided, the gates in each set controlling respectively shifts to the right of 1, 2, 4, 8 and 16 positions. Although in the illustrative embodiment of the invention shift operations may be executed by moving bits more than one position at a time, the invention may be most readily understood by considering the prior art type shift register in which bits are shifted only one position at a time.

If right rotation circuitry is provided right shifts may be easily accomplished. It is only necessary to block bits shifted out of the right end of the register from re-entry in the left end. Similarly, left rotation operations may be accomplished by first complementing the shift magnitude with respect to the number of register stages and then rotating the data word to the right. For example, if the data word is to be rotated seven positions to the left in a 20-stage register, the left rotation operation may be accomplished by rotating the data word 13 positions to the right. However, it has been believed heretofore that certain prior art right rotation circuitry could not be used to accomplish left shifts. Even if the shift magnitude is complemented with respect to the number of stages in the register and the word is then rotated to the right, the bits which must eventually remain in the register are those which are shifted out of the right end of the register. Consequently these bits must not be blocked from re-entry in the left end of the register. The bits which must be erased are those which never leave the register in the first place. For example, consider a left shift of four positions in a 6-stage register. Assume that the register initially contains a 6-bit data word represented by the following sequence: 6 5 4 3 2 1. If the (left) shift magnitude, 4, is complemented with respect to the number of stages, 6, the resulting shift magnitude is 2. If the bits are then rotated two positions to the right the register will contain the following sequence: 2 1 6 5 4 3. Now, if the original word in the register is to appear as if it was shifted four positions to the left the final word which should appear in the register is 2 1 0 0 0 0, where a 0 represents the erasing of a bit. Thus it is seen that if the shift magnitude is first complemented with respect to the number of stages and the bits are then rotated to the right a number of stages equal to the complemented shift magnitude, the bits which must remain in the register are those which are shifted out of the right end and reinserted in the left end, and the bits which must be erased are those which are never shifted out of the right end of the register in the first place. Thus, unlike the case of right shifts, a simple blocking mechanism does not appear available to accomplish left shifts.

In accordance with the principles of my invention, left shifts are accomplished with the use of right rotation circuitry by erasing from the register those bits which do not leave the right end of the register. Advantageously, these bits may be erased during the shifting process, a bit being erased when it is determined that the bit will in no event leave the right end of the register by the time the shifting operation is terminated. In other words, 0's may be written into some of the stages of the register even before the shifting operation is over if it is determined that the bits in these stages cannot possibly be shifted out of the register. This technique may be applied to conventional shift and rotate circuits in which the bits may be shifted only one position at a time and also to the improved shift and rotate circuit of Cagle et al. in which the shifting takes place in movements of more than one position at a time. In either case unidirectional rotate circuitry may be used to accomplish shift and rotate operations in both directions.

It is a feature of my invention to control the shifting and rotating of data words in either direction with the use of unidirectional rotating circuitry, with 0's being written automatically in certain ones of the register stages to accomplish an apparent shift in the direction opposite to that in which the unidirectional rotating circuitry is operative.

Further objects, features and advantages of the invention will become apparent upon consideration of the following detailed description in conjunction with the drawing in which:

FIG. 3A is a detailed schematic of an illustrative gate, shown symbolically in FIG. 3B, which may be used in the block diagram circuit of FIGS. 4–11, and FIG. 3C depicts the operation of the gate for various input conditions;

FIG. 12 shows the arrangement of FIGS. 4–11.

*Principles of operation for a 16-bit shift and rotate circuit (FIG. 1)*

Figure 1:
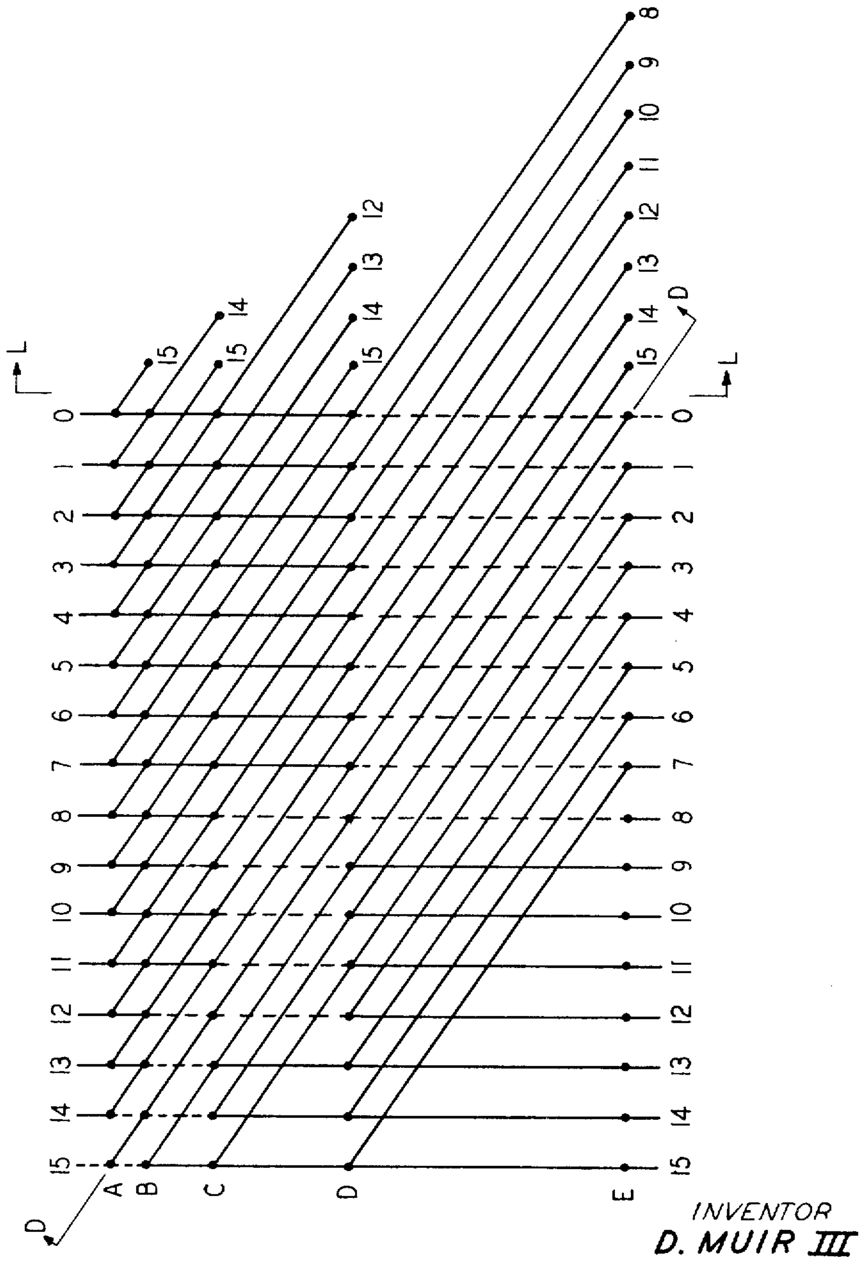
FIG. 1 depicts the principles of operation of the shift and rotate circuit of the invention for a data processor in which data words are 16 bits in length.

In FIG. 1 a matrix array of nodes is shown, the array comprising 16 columns and 5 rows. Each node represents a stage of the register and all stages are represented at least 5 times. The nodes in each column represent the same register stage. Each node is identified by a number and a letter. For example, node 7D is in column 7 and row D and represents stage 7 of the register. Nodes 7A, 7B, 7C and 7E also represent stage 7 of the register. All nodes to the right of line L—L have designations identical to respective nodes to the left of line L—L and thus each stage is represented only once in each row.

A line, vertical or diagonal, between any two nodes represents a transmission path. The bit value at any node, i.e., in any stage, is transmitted either along the vertical path to the node in the next row in the same column, or along a diagonal path to a node in the next row but to the right. For example, considering the nodes in row C the bits in the register stages may remain unchanged or may be shifted to stages four positions to the right. The system, described in detail below, includes a single set of "vertical" gates each of which merely controls the rewriting of any bit in the register in the same stage. The system also includes four sets of "diagonal" gates which control the shifting of the bits in steps of 1, 2, 4 and 8 positions, respectively. To accomplish a right rotation four steps are required. During the first step either the set of vertical gates is operated, or the first set of diagonal gates, connecting adjacent stages, is operated. If the vertical gates are operated the data word in the register is unchanged. If the diagonal gates are operated the data word is shifted one position to the right. During this first step the transmission paths emanating from the row in row A of FIG. 1 are considered. If the vertical paths are taken the bits in the register remain unchanged since they are rewritten into the same stages of the register, i.e., the bits are transmitted to the same numbered nodes in row B. If the diagonal paths are taken the bits in the register are all shifted one position to the right.

During the second step either all of the vertical gates are operated or all of the diagonal gates which control the transfer of bits from each stage to the stage two positions to the right are operated. (In this connection it should be noted that the stage two positions to the right of stage 0 is stage 14, and the stage two positions to the right of stage 1 is stage 15.) If the vertical gates are operated the word in the register is unchanged. This is seen from an examination of FIG. 1 since the bit at any node in row B is transmitted down to the same numbered node in row C, i.e., the bit in any register stage is merely rewritten in the same stage. On the other hand, if in step 2 the diagonal paths are taken each bit in the register is rotated two positions to the right. Since, for example, node 10B is connected by a diagonal path to node 8C the bit in stage 10 of the register is shifted to stage 8 of the register. Similarly, the bit in stage 0 of the register is shifted to stage 14, etc.

In step 3 of the operation either all of the vertical gates are operated or all of the diagonal gates which connect respective stages to the stages four positions to the right are operated. If the vertical gates are operated the entire data word is merely rewritten in the register. If the diagonal gates are operated the data word is rotated four positions to the right. Again, either all of the vertical gates or all of the gates in a set of diagonal gates are operated. Referring to FIG. 1 the bits at the nodes in row C are transmitted either directly down to the nodes in row D or to the right to the nodes in row D. Similar remarks apply to the fourth step in the operation during which the vertical gates are all once again operated or the gates in the fourth set of diagonal gates are all operated. In the former case the data word is merely rewritten in the register. In the latter case the data word is shifted eight positions to the right in a single step. It must be remembered that the actual operation performed is the writing of bits in the register stages rather than the shifting of bits from one set of nodes to another. This is depicted in FIG. 1 if it is borne in mind that the nodes in all five rows represent the stages of the same register. The node representation of FIG. 1 is helpful because it affords a clear visualization of the various overall shifting operations.

Figure 2:
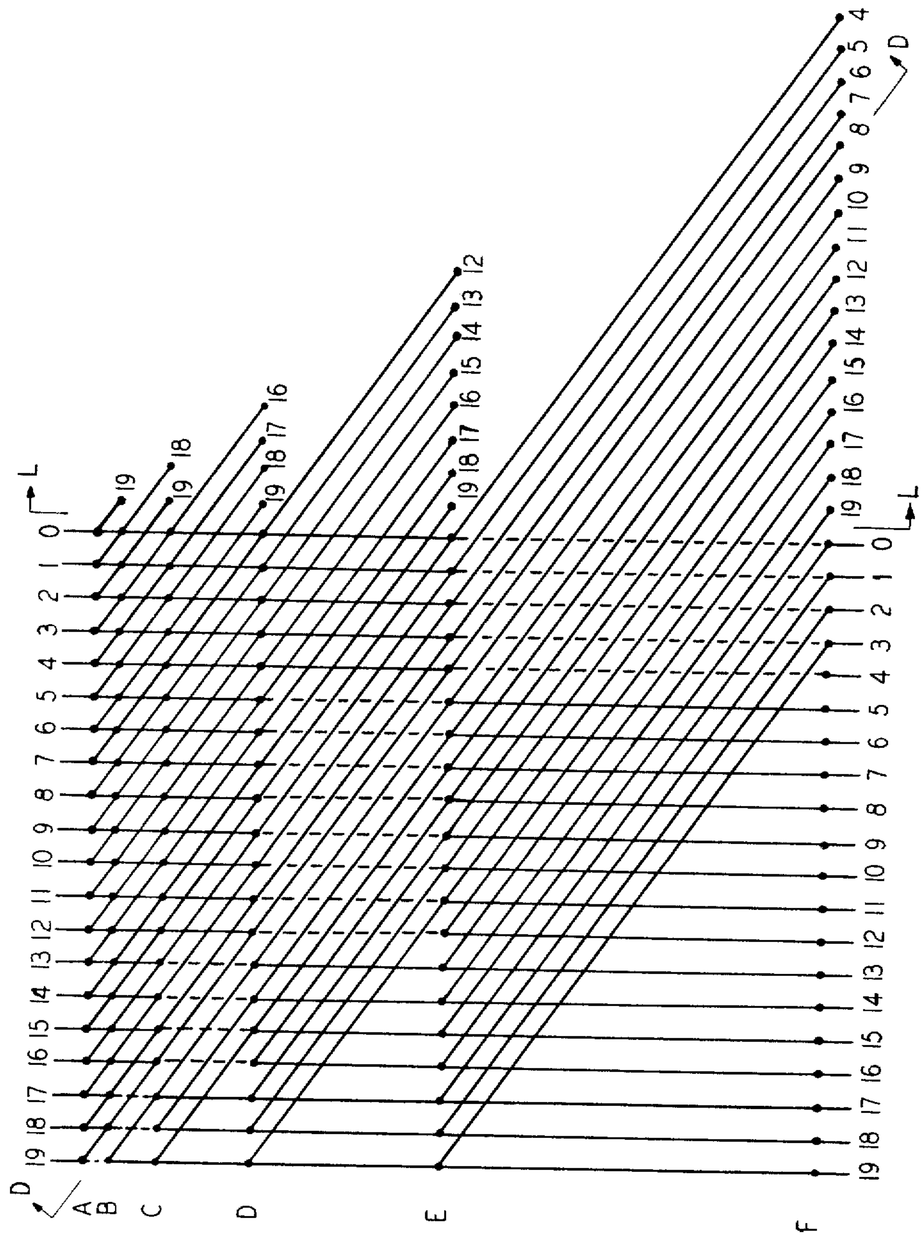
FIG. 2 depicts the principles of operation of the shift and rotate circuit of the invention for a data processor in which data words are 20 bits in length.

The illustrative embodiment of the invention is a 20-bit system, the switching scheme for which is depicted in FIG. 2. However before this latter relatively complex switching plan is analyzed the simpler plan of FIG. 1 must be understood. The implementation of a 16-bit system, based on the switching plan of FIG. 1 is analogous to the implementation of the 20-bit system based on the switching scheme of FIG. 2. Consider first a right rotation operation in a 16-bit system. Suppose the shift magnitude specified is 11 positions. Since the choice of diagonal steps is limted to steps of 1, 2, 4 and 8, to accomplish a shift of 11 positions diagonal steps of 1, 2 and 8 are required. Consider the bit initially in stage 7 for example. During the first step of the operation all of the diagonal paths between the nodes in row A and the nodes in row B are taken. Thus the bit at node 7A is transmitted to node 6B, i.e., the bit in stage 7 of the register is shifted to stage 6. During the second step of the operation the diagonal paths between the nodes in row B and the nodes in row C are taken rather than the vertical paths. The bit at node 6B is thus transmitted to node 4C, i.e., the bit in stage 6 is transferred via a respective diagonal gate to stage 4. During the third step of the operation all of the vertical paths between the nodes in row C and the nodes in row D are taken. Consequently the bit under consideration, now at node 4C, is transmitted down to node 4D. During this step all of the 16 vertical gates in the system are operated and the bit in stage 4 of the register is merely rewritten in the stage. During the fourth step of the operation all of the diagonal paths between the nodes in row D and the nodes in row E are taken rather than the vertical paths. Consequently the bit under consideration at node 4D, is transmitted to node 12E, i.e., the bit originally in stage 7 and now in stage 4 is transferred to stage 12 by the diagonal gate connecting stage 4 to stage 12. Thus after the four steps in the sequence the bit originally in stage 7 appears in stage 12, i.e., the bit has been rotated 11 positions to the right as required.

Right shifts are easily accomplished by blocking all of the diagonal gates represented by the diagonal transmission paths which cross line L—L. It is to be recalled that during a right shift bits shifted out of the right end of the register must not be reinserted in the left end of the register. Thus during the first step in the operation if the vertical paths are taken none of the vertical gates are blocked. However if the diagonal paths are taken, i.e., all bits are shifted one position to the right, the gate which connects stage 0 to stage 15 is blocked. When a gate is blocked a 0 is understood to be automatically written in the stage to which the gate transmits a bit. Thus when the transmission path between node 0A and node 15B is blocked the gate which connects stage 0 of the register to stage 15 of the register is controlled to write a 0 in stage 15 independent of the bit value initially in stage 0.

During the second step of a right shift operation if the vertical paths between the nodes in row B and the nodes in row C are taken none of the 16 vertical gates in the system are blocked. However if the diagonal paths are taken the bits which cross line L—L must be blocked. Thus the transmission paths between nodes 0B and 14C and nodes 1B and 15C must be blocked. The two gates which connect stages 0 and 1 of the register to respective stages 14 and 15 are controlled to automatically write 0's in stages 14 and 15 independent of the values of the bits in stages 0 and 1 at the termination of step 1.

A similar analysis of FIG. 1 shows that during the third step if the diagonal gates in the third set are operated four of these gates must be blocked since four diagonal paths between the nodes in row C and the nodes in row D cross line L—L. The four diagonal gates connecting stages 0–3 to respective stages 12–15 are controlled to automatically write 0's in stages 12–15 independent of the values of the bits initially in stages 0–3 at the termination of the second step. Similarly, if the fourth set of diagonal gates are operated in the fourth step of the operation rather than the vertical gates, eight of these diagonal gates are blocked and 0's are automatically written in stages 8–15 of the register independent of the values of the bits in stages 0–7, initially in the register at the termination of the third step. After the fourth step, either vertical or diagonal is taken, the bits which appear at the nodes in row E represent the shifted data word, i.e., the bits in the register are the same as the initial bits in the register except for their being shifted to the right by the required number of stages.

A rotation to the left is easily accomplished. The shift magnitude is merely complemented with respect to the number 16 and the complemented magnitude is used to control a right rotation operation. For example, to rotate the data word 7 positions to the left the data word is actually rotated 9 positions to the right. Thus the right rotation circuitry may be used to perform left rotations by merely complementing the shift magnitude with respect to the number 16 before using it as the "steering word" to control the actual (right) rotation.

The fourth operation which must be considered is a left shift. As described above it has heretofore been believed that certain prior art right rotation circuitry could not be used to accomplish left shifts. In accordance with an aspect of my invention however the right rotation circuitry may be used to accomplish left shifts with surprisingly few additional control functions. Although little additional circuitry is required the analysis may be quite complicated in any given system and for this reason the 16-bit case will be considered in detail at this time.

For performing left shifts with right rotation circuitry the proper steering word may once again be obtained by first complementing the given shift magnitude with respect to 16. By then rotating the input data word to the right a number of positions equal to this complemented value, the input data word will be given the effect of being rotated the proper number of positions to the left. But during a shift operation 0's must be written at one of the ends of the output word. For right shifts 0's may be easily written at the nodes at the left end of the system merely by blocking the diagonal paths which cross the line L—L. But a similar blocking technique for left shifts is difficult to envision because the bits which cross the line L—L must remain in the system when the input data word is shifted to the left and those bits which do not cross line L—L must be forced to be 0's by the end of the operation. For example, consider an input data word which consists of 16 1's. Suppose the magnitude given for the left shift is 5. The final data word at the nodes in row E should be 1111111111100000. If the input data word is rotated 11 positions to the right the 11 least significant bits in the input word cross the line L—L and appear in the 11 most significant positions in the final word. It is only the five bits which do not cross the line L—L which must be made 0's during the course of their transmission through the system in order that the five least significant bits in the final word be all 0's. The changing of these five bits to 0's appears difficult because these five bits never cross the line L—L and it is not obvious that a particular group of diagonal paths may be blocked such as in the case of a right shift.

The starting point in the analysis is the following principle, which may be deduced from the discussion immediately above: A left shift operation may be performed if the magnitude of the left shift called for is complemented with respect to 16 and then right transmission through the system is allowed only for those data bits which cross the line L—L. If somewhere in the network 0's are substituted for the bits which do not cross L—L, 0's will appear, as required, at the rightmost nodes in row E.

The diagonal line D—D is superimposed on the path 15A–0E, this latter path actually comprising four distinct transmission paths. All vertical paths passing through the line D—D, and all vertical paths which terminate at a node along the line D—D are dotted in FIG. 1. Thus the path 0D–0E and the output path which goes downward from node 0E are dotted because they terminate at a node along line D—D. The seven vertical paths 1D–1E through 7D–7E are dotted because they cross the line D—D. The two vertical paths 8C–8D and 8D–8E are dotted because they each terminate at node 8D which is along the line D—D. The three vertical paths 9C–9D 11C–11D are dotted because they cross the line D—D. The two vertical paths 12B–12C and 12C–12D are dotted because they each terminate at node 12C through which line D—D passes. Vertical path 13B–13C is dotted because D—D passes through it. The two vertical paths 14A–14B and 14B–14C are dotted because they each terminate at node 14B which lies along D—D. Vertical path 15A–15B and the vertical paths connected above node 15A are also dotted because they terminate at node 15A which lies along D—D.

Once the dotted vertical paths are determined a left shift may be accomplished with the use of right rotation circuitry in a surprisingly simple manner. All that is required is that the left shift input magnitude be complemented with respect to 16 and the input data word then be rotated to the right a number of positions equal to the complemented value—with all of the dotted vertical paths being blocked, i.e., the nodes at the lower end of each of the paths having 0's automatically written on them when respective vertical steps are taken. By absolutely blocking the dotted vertical paths when a left shift operation is to be performed 0's will automatically appear in the required number of rightmost nodes in row D, i.e., 0's will automatically appear in the required number of rightmost stages in the register. The blocking of the vertical paths which cross the diagonal D—D has the effect of allowing data bits to remain in the register only if they cross line L—L. It might be observed that the four diagonal paths which lie along the line D—D could also be blocked without any adverse effect on the operation because the blocking of the dotted vertical paths ensures that no data bits ever arrive at nodes on the line D—D. A convenient use for the blocking of some of these diagonal paths will be described below.

In order to design a shift and rotate circuit for other than 16-bit data words it is necessary to clearly understand why blocking the dotted vertical paths in FIG. 1 insures that 0's appear on the correct number of rightmost nodes in row E after the input data word is transmitted through the network. The selection of the vertical paths to be dotted is based on the fundamental principle given above. By blocking the vertical paths represented by the dotted lines it is guaranteed that 0's will be substituted for those bits in the original data word which do not cross the line L—L by the time they reach the nodes in row E.

The vertical paths in FIG. 1 fall into three groups, the dotted paths along D—D, the vertical paths to the upper right of the dotted paths, and the vertical paths to the lower left of the dotted paths. The key to the vertical path scheme is to insure that a 0 is substituted for any bit which cannot cross L—L during transmission through the network. Consider first the bits at the nodes at the upper right of the network. The bit at node 0A crosses L—L if a diagonal step of one is taken. However if a vertical step is taken and the bit is transmitted to node 0B it may will subsequently cross L—L if a step of 2, 4 or 8 along a diagonal is taken. Consequently the vertical path connecting node 0A to node 0B should not be blocked. A 0 should not be substituted for the bit at node 0A even if a vertical step is taken because the bit may subsequently cross L—L and should therefore remain in the system. Consider another node, for example, node 7C. By the time the bit appears at node 7C there has been a shift of at most three positions to the right. The bit at node 7C therefore has not yet crossed L—L. The bit at node 7C may cross L—L whether the diagonal step is taken to node 3D or the vertical step is taken to node 7D. In either case the bit originally at node 7C may yet cross L—L, if the next shift of 8 is along diagonal 7D–15E or 3D–11E. Consequently the vertical path from node 7C should not be blocked, i.e., a 0 should not be substituted for the bit at node 7C, even if the vertical path 7C–7D is taken because the bit may yet cross L—L if a diagonal step of 8 is taken.

Consider now the nodes at the top of the dotted vertical paths beginning with the group of nodes 0D through 8D. By the time the original bits at the nodes in row A are transmitted to the nodes in row D a maximum shift of seven positions may have taken place. The only bits at the nodes in row D which may have already crossed L—L are those at nodes 15D through 9D, the seven leftmost nodes in the row. In no way whatsoever can the bits at nodes 8D through 0D have already crossed L—L. If these bits take the vertical paths downward from row D they will not have crossed L—L by the time they appear at the output nodes 8E through 0E. In this event these bits will not have crossed L—L and they should appear as 0's in the final word. For this reason if the diagonal step of 8 positions is not taken 0D should not be transmitted through the system and 0's should be substituted for them. A blocked vertical path results in a 0 being written at the node at the bottom of the vertical path. Thus if the diagonal step of 8 positions is not taken, 0's are automatically written at nodes 8E through 0E, i.e., *O*'s are automatically written in stages 8 through 0 of the register.

A steering word represents the actual shift magnitude for the right rotation. It comprises four bits, X1, X2, X4 and X8, each of these bits being a 1 only if the respective diagonal step is to be taken. Since the steering word represents the actual steps taken, its magnitude is the complement of the input magnitude with respect to 16 on left shifts. For example, if on a left shift the input magnitude is 9, the steering word is 0111.

Consider now the nodes in row C. The vertical paths downward from nodes 7C through 0C should not be blocked because even if the bits at these nodes take these vertical paths they may still cross L—L if X8 is a 1. But the same is not true of nodes 12C through 8C. When the step of 4 is about to be considered the maximum shift through the network thus far has been 3. Consequently bits which have already crossed L—L may appear at nodes 15C through 13C. But the bits at nodes 12C through 0C can in no way have already crossed L—L. The bits at nodes 7C through 0C need not be controlled as explained above. This leaves only the bits at nodes 12C through 8C. If the bits at these nodes take a vertical step from row C, thus appearing at nodes 12D through 8D, the bits cannot cross L—L even if the diagonal step of 8 is next taken. The furthest that any one of these bits can get is to node 0E. Since the bits at nodes 12C through 8C have not yet crossed L—L and can in no way cross L—L if X4 is a 0 the vertical paths from nodes 12C through 8C are blocked. If X4 is a 0, 0's are automatically written at nodes 12D through 8D.

Consider next the nodes in row B. No control need be exerted over the bits at nodes 11B through 0B. The bits at these nodes may subsequently cross L—L even if they take vertical steps from the nodes in row B to the nodes in row C. Even the bit at node 11B may cross L—L after a vertical step to node 11C is taken if bits X4 and X8 are 1's. Consequently no control need be exerted over the bits at nodes 11B through OB.

When the step of 2 positions is about to be considered the maximum shift that may have already been taken is 1. Consequently, the bit at node 15B may already have crossed L—L, the bit having come from node 0A. But the bits at nodes 14B through 12B cannot yet have crossed L—L and if these bits take vertical paths at row B there is no chance that they will subsequently cross L—L even if X4 and X8 are 1's. Even the bit at node 12B cannot cross L—L if it is transmitted vertically down to node 12C. If X4 and X8 are both 1's this bit may progress no further than to node 0E. Since the three bits at nodes 14B through 12B cannot cross L—L if X2 is a 0 the three respective paths are blocked. By blocking these paths and automatically writing 0's at nodes 14C through 12C these bits will appear as 0's in the final data word.

Consider next the nodes in row A. The bits at nodes 13A through 0A may cross L—L even if X1 is a 0. For example, the bit at node 13A, even if transmitted vertically to node 13B, may still cross L—L if X2, X4 and X8 are all 1's. For this reason no control need be exerted over the bits at nodes 13A through 0A. But nodes 15A and 14A must be controlled. If X1 is a 0 the two most significant bits in the system would attempt to be transmitted to nodes 15B and 14B. These bits then can in no way cross L—L even if X2, X4, and X8 are all 1's. At most the bit at node 14B can progress to node 0E. Consequently the two vertical paths 15A–15B and 14A–14B are blocked during the left shift operation. Thus if the complemented shift magnitude word contains a 0 for the X1 bit 0's must be automatically written at nodes 15B and 14B, i.e., 0's must be automatically written in stages 15 and 14.

It will be noted that the vertical line to the top of node 15A is also dotted. The maximum right rotation magnitude which may be specified is 15. Consequently the bit a node 15A can never cross L—L since it can progress to at most node 0E. The minimum magnitude which may be specified on a left shift is 1. If a left shift of 1 is specified the data word is rotated to the right 15 positions. By always writing a 0 at node 15A, a 0 will then appear at node 0E. This is required since it is obvious that on any left shift, other than the trivial case of a left shift of zero places, a 0 must appear in at least the least significant position of the final data word. For this reason the output path downward from node 0E is blocked for left shift operations. Some further implications of these last mentioned two dotted paths will be described below.

Thus by blocking all of the dotted vertical paths it is guaranteed that 0's will be substituted for any bits which appear at the nodes at the top of these paths which have no chance of crossing L—L. The nodes in the group at the upper right of the network need not be controlled since the bits at these nodes may cross L—L even if vertical steps from these nodes are taken. The only nodes that remain to be considered are those to the lower left of the dotted vertical paths, namely nodes 15E through 1E, 15D through 9D, 15C through 13C, and 15B. The bits at these nodes also need not be controlled. If a 0 appears at one of these nodes it need not be controlled since to block vertical transmission would also result in a 0 being transmitted through the network. And if the bits at these nodes are 1's they must have already crossed L—L and consequently should remain in the network. The bit at node 15C, for example, cannot have come from node 15A since the bit at node 15A is always a 0 on left shifts. If the bit at node 15C is a 1 it must have come from node 0A after a diagonal shift of 1 and a vertical step of 2, from node 1A after a vertical step of 1 and a diagonal shift of 2, or from node 2A after diagonal shifts of both 1 and 2. In any case the bit at node 15C has already crossed L—L and need not be controlled at node 15C. Similarly, any 1's appearing at the other nodes must have already crossed L—L and, since they should remain in the system, the vertical paths from these nodes should not be blocked.

(It should be noted that in the particular example of FIG. 1 shifts and rotations of 16 are not permitted since the maximum value of the steering word is 15. Also, if a circuit is designed for a 16-bit system based on FIG. 1 arrangements must be made for the trivial case in which a shift magnitude of 0 is specified on a left shift or rotation operation. The complement of 0 with respect to 16 is 16 and the network is capable of a maximum rotation of only 15. Provision must be made for these cases if a 16-bit circuit is constructed. The additional circuitry required will be apparent to those skilled in the art, especially after the more complicated case of a 20-bit system is considered below. The 16-bit network plan is being described primarily because without this foundation an understanding of the 20-bit system scheme is exceedingly difficult.)

The 16-bit case is a relatively simple one. The right rotation circuitry is used and no paths are blocked on rotations to both the right and the left, with the given shift magnitude being complemented in the latter case before the left rotate operation is actually effected by means of a right rotate operation. A right shift is accomplished by controlling an ordinary right rotate operation but with the diagonal paths crossing L—L being blocked, i.e., 0's being written at the nodes at the ends of these paths whenever the steering control word indicates that these paths should be taken. Finally, a left shift may be accomplished by first complementing the given shift magnitude and then performing a right rotate operation with the dotted vertical paths being blocked. By blocking the dotted vertical paths unconditionally in the case of a left shift it is guaranteed that the only 1's in the original data word which are transmitted all the way through the network to the nodes in row E are those which cross L—L.

What the preceding analysis has shown is that in FIG. 1 (and any like network where the number of bits in the data word is an integer power of two) there conveniently exist three non-overlapping sets of nodes and paths as follows: the sets of nodes and paths typical of those in the upper right portion of FIG. 1 which includes all those nodes and paths which may be used by data bits prior to crossing line L—L; the set of nodes and paths typical of those in the lower left portion of FIG. 1 which includes all of those nodes and paths which may be used after data bits have crossed line L—L; and the set of nodes and paths typical of those on the diagonal in FIG. 1 which belong to neither of the two prior mentioned sets and which are in no case needed by any data bit prior to crossing line L—L nor any data bit which has crossed line L—L. This latter set in FIG. 1 consists of all the dotted paths, all of the nodes with dotted paths above and below them, and the diagonal paths along line D—D from node 15A to node 0E. Although all of the dotted vertical paths were assumed to be blocked in the preceding discussion, a sufficient technique for using the network of FIG. 1 to accomplish the left shift operation is to block a subset of the dotted vertical paths along line D—D and the diagonal paths along line D—D, such subset being chosen so that each input data bit is forced to cross line L—L if it is to proceed through the entire network without being blocked. It will be recalled that FIG. 1 is merely a convenient representation of the shifting operation as it occurs in the register stages. The signals at the nodes of row A may be thought of as the condition of the register at the beginning of the shifting operation and the signals at the nodes of row E may be thought of as the condition of the register at the end of the shifting operation. Blocking the vertical path to the top of node 15A would, then, imply that register stage 15 is forced to be a 0 prior to the start of the shifting operation. Similarly, blocking the path leading downward from node 0E would imply the forcing of register stage 0 to be a 0 after the shifting operation is finished. In order to avoid such complications, one convenient subset of paths to block in FIG. 1 to accomplish the left shift operation would be to block all dotted vertical paths which intersect a line parallel to and just above line D—D except the vertical path to the top of node 15A. Then, additionally, block the two paths downward from node 15A. The blocked paths then would consist of those between the pairs of nodes 15A–15B, 15A–14B, 14A–14B, 13B–13C, 12B–12C, 11C–11D, 10C–10D, 9C–9D, 8C–8D, 7D–7E, 6D–6E, 5D–5E, 4D–4E, 3D–3E, 2D–2E, 1D–1E, and 0D–0E. It will be noted that this subset fulfills the requirement that each data bit is forced to cross line L—L if it is to proceed through the network without being blocked, i.e., if it is to appear in the register after the shifting operation is complete. Other choices of the subset of paths to block exist.

In the 16-bit case a subset of paths are blocked unconditionally. These paths are never operative when a left shift operation is being performed. In fact, in any system where the number of bits is a power of 2 and the shift magnitude word is of the form . . . (X32) (X16) (X8) (X4) (X2) (X1) a network similar to that shown in FIG. 1 may be drawn with little difficulty. The line D—D is drawn straight through the two nodes in the upper left and lower right corners. All vertical paths passing through D—D and all vertical paths which terminate (either at the top or bottom) at a node falling on line D—D are dotted. A suitable number of vertical or diagonal paths are unconditionally blocked on all left shifts and no additional control need be exerted to insure that the only 1's which are transmitted through the system are those which cross L—L, i.e., those which should not be replaced by 0's at the right end of the final word. The more difficult situation is that in which the number of bits in a data word is not a power of 2. In such a case some of the paths may not be unconditionally blocked. In certain cases these paths must remain open, i.e., they must transmit 1's down them, under special circumstances. For an appreciation of the more complicated situation attention is now directed to FIG. 2 which shows the network for a 20-bit system.

*Principles of operation for a 20-bit shift and rotate circuit (FIG. 2)*

It is assumed that the 20-bit shift and rotate network of FIG. 2 shall be required to accept commands to shift or rotate either left or right with any specified input shift magnitude from 0 through 20 places. Input shift magnitudes of greater than 20 positions are assumed to be of no interest and not allowed as a valid input command.

A five-bit shift magnitude word is required to specify one of the numbers 0–20. The steering word is thus represented as (X16) (X8) (X4) (X2) (X1). The steering word, the word which actually controls the transfer of bits in the stages of the register, is identical to the input shift magnitude if the shift or rotate operation is to the right, and is the complement of the input shift magnitude with respect to the number 20 if the shift or rotate operation is to the left. An additional group of vertical and diagonal transmission paths are used to control transmission from the nodes in row E to the nodes in row F. Shifts are accomplished in steps of 1, 2, 4, 8 and 16. FIG. 2 is to be interpreted in the same manner as FIG. 1. Transmission paths are provided for transmitting bits either vertically or diagonally to the right, these paths being the only ones required to control all four possible operations.

The operation of a 20-bit system when a 20-bit data word is to be rotated to the right is straightforward. For example, to rotate the word 19 positions to the right the input shift magnitude word is used as the steering word and is 10011. The diagonal gates which are operated are those coming from the nodes in rows A, B and E. The vertical paths which are used are those originating at the nodes in rows C and D. The final rotated data word appears at nodes 19F through 0F. To rotate to the left the shift magnitude is complemented with respect to 20 and the data word is then rotated to the right a number of positions equal to the complemented value. For example, to rotate one position to the left the shift magnitude 00001 is first complemented with respect to 20. The resulting steering word 10011 (decimal 19) is then used to control the right rotation. To shift to the right it is only necessary to block all diagonal paths crossing L—L. By then controlling the automatic writing of 0's at any node at which a diagonal path crossing L—L terminates, it is insured that 0's appear in the proper number of the leftmost nodes in row F, i.e., 0's appear in the proper number of the leftmost stages in the register. To control a left shift in a 20-bit system using right rotation circuitry is not as simple however as in the 16-bit case. The reason for this is that the vertical paths crossing the line D—D cannot in all cases be unconditionally blocked. Further analysis is required to determine which vertical paths must be blocked to accomplish a left shift.

In the 16-bit network of FIG. 1 there conveniently existed a set of dotted vertical paths which were never needed by data bits which had already crossed line L—L nor by data bits which would cross L—L at later stages of the network. This set of dotted paths was large enough that a subset of them could be chosen in such a manner that blocking this chosen subset for left shift operations would force data bits to cross line L—L were they to gain transmission through the network. However, in the network of FIG. 2, which is typical of the situation where the number of bits in the data word is not an integer power of two, the set of paths which are never needed by data bits which have already crossed line L—L nor by data bits which will cross L—L at later stages of the network consists of so few paths that a subset of them cannot be chosen and blocked unconditionally for left shift operations thereby forcing data bits to cross line L—L if they are to gain transmission to the output terminals of the network. In fact, in FIG. 2, there exist paths such as 13D–13E which may be required by bits which have crossed L—L or by bits which will later cross L—L.

A starting point in constructing the network for any system in which the number of data bits is not an integer power of two is to draw the line D—D just below the diagonal path from the extreme node at the upper left (i.e., just below the line from 19A to 8F in FIG. 2). All of the vertical paths crossing D—D are then made dotted. The set of nodes and paths to the lower left of the set of dotted paths includes all of the nodes and paths required by data bits which have already crossed line L—L. Thus blocking conditions imposed on the dotted paths can in no way affect any data bits which have crossed L—L. The technique for using the network of FIG. 2 to accomplish left shift operations will be explained in detail below but it is, in essence, to block the set of dotted vertical paths unless a data bit using a particular dotted path is being steered at subsequent stages of the network to cross line L—L.

There are 20 dotted vertical paths in FIG. 2, one for each column. It will be recalled that in FIG. 1 all of the vertical paths in the circuit network fall into three distinct groups, the dotted vertical paths, those at the upper right of the drawing, and those at the lower left. In FIG. 1 the vertical paths at the upper right are not controlled on left shifts because even if these paths are taken the bits at the respective nodes can subsequently cross L—L. (The basic rule for controlling a left shift is still the same: The input shift magnitude is complemented with respect to the number of bits in a data word and a right rotation is then controlled, with the only 1's in the original word which are allowed to be transmitted to the output nodes being those which cross L—L sometime during their transmission through the network.) In the 20-bit system of FIG. 2 the same remarks apply to the nodes and vertical paths at the upper right of the drawing. Even if the bits at these nodes take the respective vertical paths they may still cross L—L later on and for this reason the vertical paths at the upper right should not be blocked. In FIG. 1 all of the dotted vertical paths are unconditionally blocked. No blocking of the vertical paths at the lower left is desired because 1's at the nodes at the top of these paths must have already crossed L—L. But in FIG. 2 the dotted vertical paths are not all unconditionally blocked and it is possible for 1's in the original data word to be transmitted down these dotted paths under certain circumstances to the nodes at the lower left of the drawing. For these reasons consideration must also be given to the vertical paths at the lower left of the drawing, although as will be seen below the control used for the dotted vertical paths is such that no control is required for the vertical paths at the lower left of the drawing.

It must first be appreciated why all of the dotted vertical paths may not be unconditionally blocked. Consider path 12D–12E which crosses D—D. When the bits in the input word appear at the nodes in row D a step of 8 is about to be considered. The maximum possible shift taken in the first three steps is 7 (if X1, X2 and X4 are all 1's). The bit at node 12D, i.e., the bit in stage 12 of the register after the third of the five steps in the sequence has been taken, can in no way have already crossed L—L. The bit at node 12D may have come only from one of the nodes 12A through 19A. Following the pattern set down in FIG. 1 path 12D–12E should be unconditionally blocked if X8 is a 0. In FIG. 1 the dotted vertical paths are blocked because, were they to be taken, the bits at the nodes at the tops of the paths could in no way subsequently cross L—L by the time they appear at the final row of nodes. But the bit at node 12D in FIG. 2 can cross L—L even if X8 is a 0. If X8 is a 0 the bit at node 12D is transmitted to node 12E. As long as X16 is a 1, the bit at node 12E will cross L—L and end up at node 16F. Consequently vertical path 12D–12E cannot be unconditionally blocked because the bit at node 12D may yet cross L—L even if vertical path 12D–12E is taken. It will be noted however that the bit at node 12D can cross L—L even if the vertical path is taken only if X16 is a 1. Consequently vertical path 12D–12E should be blocked conditionally, i.e., a 0 should be automatically written at node 12E if X8 is a 0 unless X16 is a 1. If X16 is a 1 vertical path 12D–12E need not be blocked because it is guaranteed that the bit at node 12D will subsequently cross L—L.

It is necessary to derive a suitable transmission function for each of the dotted vertical paths in FIG. 2. The transmission function for each path essentially states the following: On a left shift the path is to be blocked unless it is guaranteed that the bit at the node at the top of the path will subsequently cross L—L. The method now to be shown may be used for deriving the transmission functions of the vertical paths crossing the line D—D in other systems. Each transmission function is a Boolean expression. The total expression is a 1 if the respective vertical path is to be operative. It is a 0 if the respective vertical path is to be blocked and a 0 is to be automatically written at the node at which the path terminates. In the transmission functions to be derived the expression (HL) represents an input command to perform a left shift operation. HL is a 1 if a left shift is to be performed. It is a 0 if one of the other three possible operations is to be carried out.

The five nodes 4E through 0E are first considered. The input bits appear at these nodes when the step of 16 positions is about to be taken. Up to this point the maximum shift which may have taken place is 15 (8+4+2+1). Bits at nodes 19E through 5E may have already crossed L—L. But the bits at nodes 4E through 0E may in no case have already crossed L—L, since node 4E is 16 positions to the right of line L—L and nodes 3E through 0E are even further away. If the diagonal step of 16 is not taken from these five nodes the bits at these nodes will not have crossed L—L by the time they appear at the nodes in row F. For this reason the vertical paths from nodes 4E through 0E must be unconditionally blocked on left shifts. The transmission function for the five vertical paths 4E–4F through 0E–0F is ($\overline{X16}$) ($\overline{HL}$). (The term X16 represents the most significant bit in the steering word after it has been formed from the complement of the input shift magnitude. In other words, X16 is a 1 if the diagonal paths from nodes E are to be taken.) The transmission function ($\overline{X16}$) ($\overline{HL}$) for the five vertical paths 4E–4F through 0E–0F depicts the operation of the paths in all cases. In the three cases other than left shifts HL is a 0 and $\overline{HL}$ is a 1, thus making the path transmission only a function of the steering term $\overline{X16}$. If X16 is a 0, $\overline{X16}$ is a 1 and the transmission function is a 1. The vertical paths may be used as required. If X16 is a 1, $\overline{X16}$ is a 0 and the vertical paths are blocked. Even though a left shift operation is not being performed the vertical paths may be blocked by the steering term because they are not required. (Although the blocking of a vertical path has been described above as controlling the automatic writing of a 0 at the node at the bottom of the path, a 0 is automatically written at the node only if a 1 does not come along the diagonal path terminating at the same node. Thus when X16 is a 1 although the five vertical paths may be blocked, 1's may appear at nodes 4F through 0F if 1's originally appear at nodes 0E and 16E through 19E.) If, on the other hand, HL is a 1 indicating that a left shift operation is being performed $\overline{HL}$ is a 0, and the five vertical paths are blocked no matter what the value of X16. This is the desired operation. If X16 is a 0 the vertical paths would normally transmit 1's but instead are blocked as required. The blocking of vertical paths 4E–4F through 0E–0F on left shifts is unconditional as seen from the transmission function ($\overline{HL}$) ($\overline{X16}$).

Consider next nodes 12D through 5D in row D. When a step of 8 is about to be taken the maximum shift which can thus far have taken place is 7 (4+2+1). Bits which have already crossed L—L may appear at nodes 19D through 13D but the bits at node 12D and the bits at nodes to the right of 12D can in no way have already crossed L—L. If X8 is a 0 and the eight vertical paths 12D–12E through 5D–5E are taken it is still possible for the bits originally at nodes 12D through 5D to cross L—L. Even if these vertical paths are taken and the bits are transmitted to nodes 12E through 5E the eight bits may still cross L—L in the last step if X16 is a 1. Consequently while the eight vertical paths should be blocked on left shifts if X8 is a 0, the blocking is conditional. The paths must not be blocked if X16 is a 1. If X16 is a 1 the eight vertical paths may be used even through the bits which are transmitted down them have not already crossed L—L because it is guaranteed that the bits will subsequently cross L—L in the last step.

The transmission function for the eight vertical paths 12D–12E through 5D–5E is ($\overline{X8}$) ($\overline{HL}$)$+X16$. On the three operations other than left shifts HL is a 0, $\overline{HL}$ is a 1 and thus the bracketed expression is also a 1. For these three operations there is no need to block the vertical paths other than as a function of the steering term, X8. If X8 is a 0, $\overline{X8}$ is a 1 and the transmission function is a 1; the paths are indeed not blocked. If X8 is a 1, $\overline{X8}$ is a 0, the transmission function is a 0 and transmission through the vertical paths is denied by the steering term. If a left shift operation is being performed, on the other hand, HL is a 1 and $\overline{HL}$ is a 0. In this case the transmission function reduces to ($\overline{X8}$) [X16]. If X16 is a 0 the transmission function becomes a 0. This is the desired action; on left shifts the eight vertical paths 12D–12E through 5D–5E should be blocked if X16 is a 0. On the other hand, if X16 is a 1 the transmission function reduces to the steering term $\overline{X8}$. Thus the vertical paths are not blocked. This is the required action since these eight vertical paths are to be unblocked and allow vertical transmission if X16 is a 1 even on left shifts.

Consider next the bits at nodes 15C through 13C. (Node 16C which is also at the top of a dotted vertical path between rows C and D will be considered afterward.) When a step of 4 is about to be taken the bits at nodes 15C through 13C cannot possibly have already crossed L–L. The three vertical paths 15C–15D through 13C–13D should be blocked on left shifts unless it is guaranteed that the bits at nodes 15C through 13C will subsequently cross L–L. Regardless of the value of X8 the three bits which are transmitted down to nodes 15D through 13D can still cross L–L if X16 is a 1. If $X8=1$ a shift of 8 is taken between rows D and E but X16 must also be a 1 for these bits to cross L–L (X8 and X16 would actually never both be 1's because this would imply a steering word whose value is greater than 20). Consequently the three bits at nodes 15C through 13C are guaranteed to subsequently cross L–L even if the dotted vertical paths are taken if and only if X16 is a 1. Thus these three vertical paths must be conditionally blocked in the same manner as the eight vertical paths 12D–12E through 5D–5E. The transmission function for these three paths is identical to the transmission function previously considered except that the steering term ($\overline{X8}$) is replaced by the term ($\overline{X4}$). The transmission function for the three vertical paths 15C–15D through 13C–13D is thus ($\overline{X4}$) [$\overline{HL}+X16$].

It is also impossible for the bit at node 16C to have already crossed L–L when the step of 4 is about to be taken since the maximum shift thus far may be at most 3 (2+1). But path 16C–16D is in a different category than paths 15C–15D through 13C–13D. If the vertical path 16C–16D is taken it is impossible for the bit at node 16C to subsequently cross L–L even if X16 is a 1. Since the input shift magnitude and the steering word which is the complement with respect to 20 of this magnitude must be 20 or less, X8 must be a 0 if X16 is a 1 and the bit at node 16C, if $X4=0$, can progress no further than to node 0E. Consequently the bit at node 16C may in no case cross L–L if the vertical path 16C–16D is taken. Thus path 16C–16D must be unconditionally blocked. The transmission function for this path is $(\overline{X4})(\overline{HL})$. On all operations other than left shift, $(\overline{HL})$ is a 1. If steering function X4 is a 0, $(\overline{X4})$ is a 1, the transmission function is a 1 and vertical path 16C–16D may be taken as required. If X4 is a 1 the transmisission function is a 0 as required for proper steering of bits through the network. If, on the other hand, HL is a 1 as it is for left shifts, $(\overline{HL})$ is a 0, the transmission function is a 0 and the vertical path is unconditionally blocked.

When a step of two positions is about to be taken the bits in the original word may have already been shifted a maximum of one position. Thus, the bits at nodes 18B and 17B in no way may have already crossed L–L. Suppose these bits take the respective vertical paths to nodes 18C and 17C. For the bit transmitted to node 17C to cross L–L it must yet be shifted 18 positions to the right. The bit at node 18C must yet be shifted 19 positions to the right. The only steps remaining are those of 4, 8 and 16 positions. Steps of 8 and 16 positions are both not allowed. The only combination of steps guaranteeing that both bits cross L–L is 4 and 16. Consequently, paths 18B–18C and 17B–17C should be blocked on all left shifts unless X4 and X16 are both 1's. The transmission function for these two paths is $(\overline{X2})[\overline{HL}+(X16)(X4)]$. This transmission function describes the action of the two paths during all four types of operation. On the three operations other than left shift $(\overline{HL})$ is a 1. The vertical paths transmit data bits if X2 is a 0. This is the required action since the two paths should function in the normal manner whenever a vertical step is required between nodes 18B and 18C and nodes 17B and 17C on all operations other than left shift. If X2 is a 1 the two paths do not transmit data bits since the diagonal paths are taken rather than the vertical paths from nodes 18B and 17B. On left shifts $\overline{HL}$ is a 0. If X2 is a 0, $\overline{X2}$ is a 1 but the transmission function is a 1 only if both X4 and X16 are 1's. Thus, the vertical paths are blocked on all left shifts unless it is guaranteed that 1's transmitted down these paths will subsequently cross L–L.

The last dotted vertical path crossing D–D to be considered is 19A–19B. The transmission function for this path is the same as the one just derived for paths 18B–18C and 17B–17C. If a 1 at node 19A is transmitted vertically to node 19B it can cross L–L only if it is subsequently shifted 20 positions to the right. Consequently, the path is blocked on all left shifts unless both X4 and X16 are 1's. It should be noted that if X4 and X16 are both 1's and the operation being performed is a left shift, the original uncomplemented shift magnitude must have been zero. Path 19A–19B will thus be blocked on all left shifts unless the input data word is not to be shifted at all. This is the required action because if the data word is shifted at all to the left, the bit at node 19A, the leftmost bit in the original data word, must be erased from the system.

The 20 transmission functions just derived for the 20 dotted vertical paths define the action of these paths on all four types of operation. The vertical paths to the upper right of these paths need not be controlled other than by the steering functions because the bits at the nodes at the tops of these paths may subsequently cross L—L even if they take vertical steps. Thus no special control is required of these vertical paths when a left shift is being performed. No special control is ever required for a vertical path when one of the other three types of operation is being performed. Consequently, the transmission function for each of these paths is merely of the form $(\overline{Xi})$. Each of these paths transmits a bit down through it only if its controlling bit in the steering word is a 0. If the controlling bit is a 1 and the diagonal paths are to be taken, the transmission functions for the vertical paths are 0's.

The last group of vertical paths to be considered are those at the lower left of the drawing. In FIG. 1 the transmission functions for these paths are merely of the form $(\overline{Xi})$. Even on left shifts transmissions should be granted if $Xi$ is a 0 because any 1's which appear at the nodes at the tops of these paths must have already crossed L—L. The same is not true, however, if the vertical paths at the lower left of FIG. 2. Because some of the dotted vertical paths may not be blocked on left shifts 1's may be transmitted down these paths to the nodes at the lower left of the drawing even if they have not yet crossed L—L. But it is to be recalled that 1's are so transmitted down the vertical paths only if it is guaranteed that they will subsequently cross L—L. Consequently, it is not necessary to provide additional blocking for any of the vertical paths at the lower left of the drawing. The transmission functions for these paths is again of the form $(\overline{Xi})$.

The transmission functions for the diagonal paths must yet be derived. Almost all of the diagonal paths have transmission functions of the form $(Xi)$. The diagonal paths are taken whenever the respective controlling bits in the shift magnitude word are 1's. The diagonal paths whose transmission functions are not of the simple form $(Xi)$ are those which cross L—L. It will be recalled that on right shifts these paths must be blocked. The transmission functions for the diagonal paths crossing L—L are thus of the form $(Xi)(\overline{HR})$. HR is a 1 only when the operation performed is a right shift. When a right shift operation is performed the diagonal paths crossing L—L are blocked since their transmission functions are 0's. When one of the other three types of operation is being performed HR is a 0 and the transmission functions of the diagonal paths crossing L—L are reduced to the form $(Xi)$ since these diagonal paths are controlled in the same manner as are the other diagonal paths in the network.

The analysis of FIG. 2 has been given in order that the method of derivation of the transmission functions for all types of paths be understood even when they must be derived for a system in which the number of bits in a data word is not a power of two. FIGS. 4–11 show an illustrative circuit implementation for a 20-bit system based on the network of FIG. 2.

*20-bit shift and rotate circuit (FIGS. 4–11)*

The gates in the shift and rotate circuit are shown only in block diagram form. Before proceeding to an analysis of the shift and rotate circuit it is necessary to consider the particular gate circuit used. The basic gate circuit is shown in FIG. 3A, FIG. 3B showing the symbolic notation for the gate used throughout the detailed drawing. FIG. 3C is a table indicating the output of a three-input gate for the eight combinations of input signal levels.

The operation of the gate may be succinctly described as follows: The output is low (0) only if all inputs are high (1). Conversely, the output is high if at least one input is low. Throughout the illustrative embodiment of the invention, low level (ground) signals represent 0's, and high level signals represent 1's. Referring to FIG. 3A, if all inputs are high all of the input diodes are reverse biased. Consequently, current flows from source 300 through resistor 301, diode 303 and the base-emitter junction of transistor 3Q1. The transistor conducts and the output is short circuited through the transistor to ground.

Thus, if all inputs are high, the output is low. However, if at least one input is low, current from source 300 flows through the respective input diode to the low level input source. Current does not flow through diode 303, and transistor 3Q1 remains nonconducting. The collector of this transistor, the output of the gate, is thus high, equal in magnitude to the potential of source 302. All that is required is for one of the inputs to be low for the output to be high.

FIG. 3C illustrates the operation of the gate when three inputs are provided. The output of the gate is a 1 if at least one of the inputs is a 0. The output is low only if all inputs are high. If a particular gate has only one input it functions as an inverter. If the input is low the output is high, and if the input is high the output is low.

The particular gate employed in the illustrative embodiment of the invention is advantageous for the following reason. The outputs of two gates may be tied together and the combined output will be low if either of the individual outputs is low. Referring to FIG. 3A it will be noted that even though transistor 3Q1 may not conduct, the output may still be low if the output terminal is shorted to ground through the transistor in some other gate whose output terminal is connected to ground through the respective transistor. In the system described below an input bus to each register stage is fed by a variety of gates, a vertical gate from the same stage and a group of diagonal gates from stages to the left. Only one of these gates is to function during any step because either all of the diagonal gates in one of five groups or all of the vertical gates operate. By controlling the transistor in the unoperated gates to remain off the potential on each input bus will be controlled solely by the operation of the selected gate. If the transistor in this gate does not conduct the potential of the input bus will be high. If the transistor does conduct however the potential of the bus will be low. Consequently the potential on each input bus may be controlled in accordance with the state of only one of the register stages. The unoperated (or blocked) gates always supply high potentials for the input busses. It is the selected gate which actually controls the potential of the bus depending on whether or not the transistor in this gate conducts.

Figure 4:
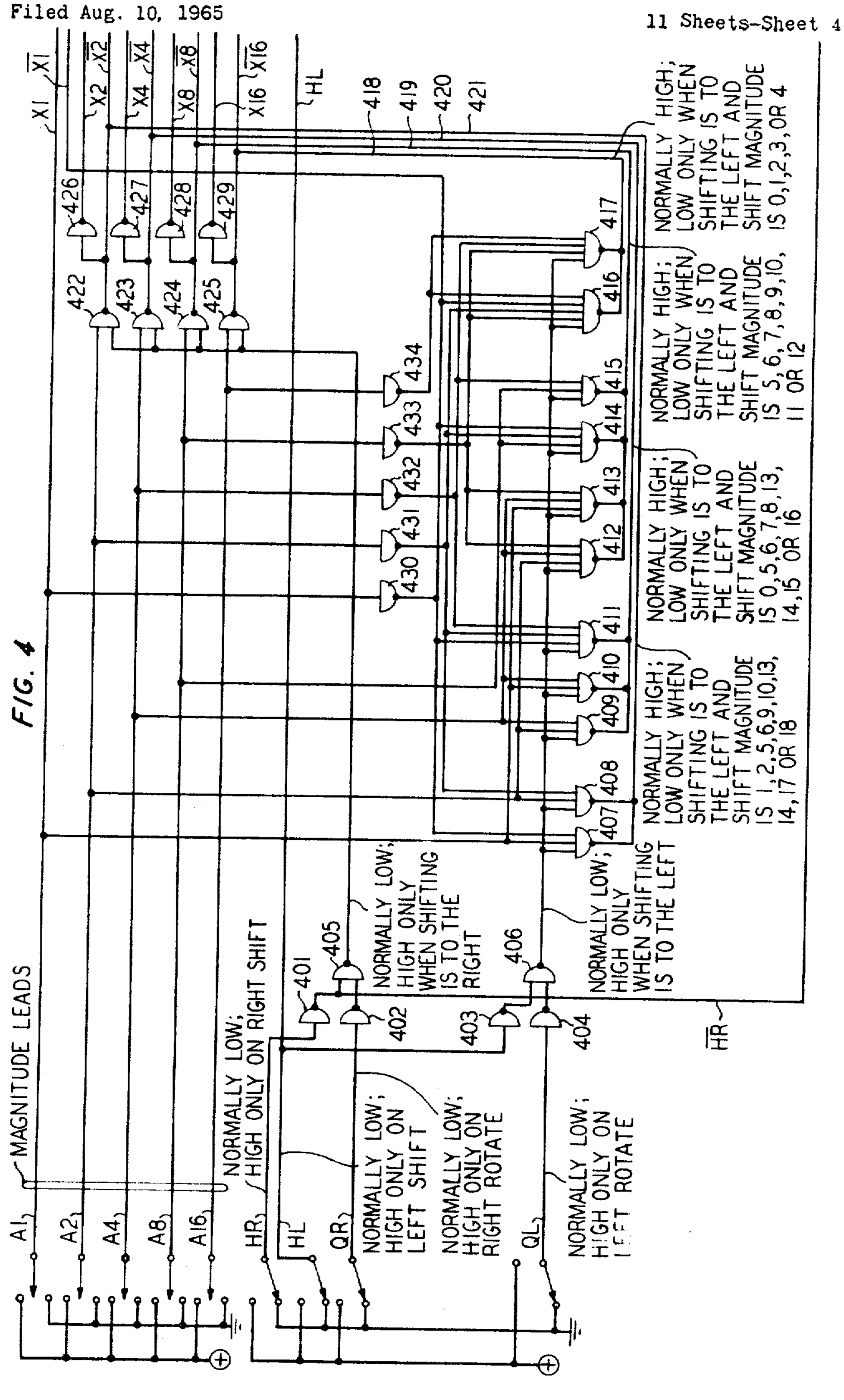
FIGS. 4–11 depict the illustrative embodiment of the invention, a shift and rotate circuit for use with a 20-stage register.
Figure 5:
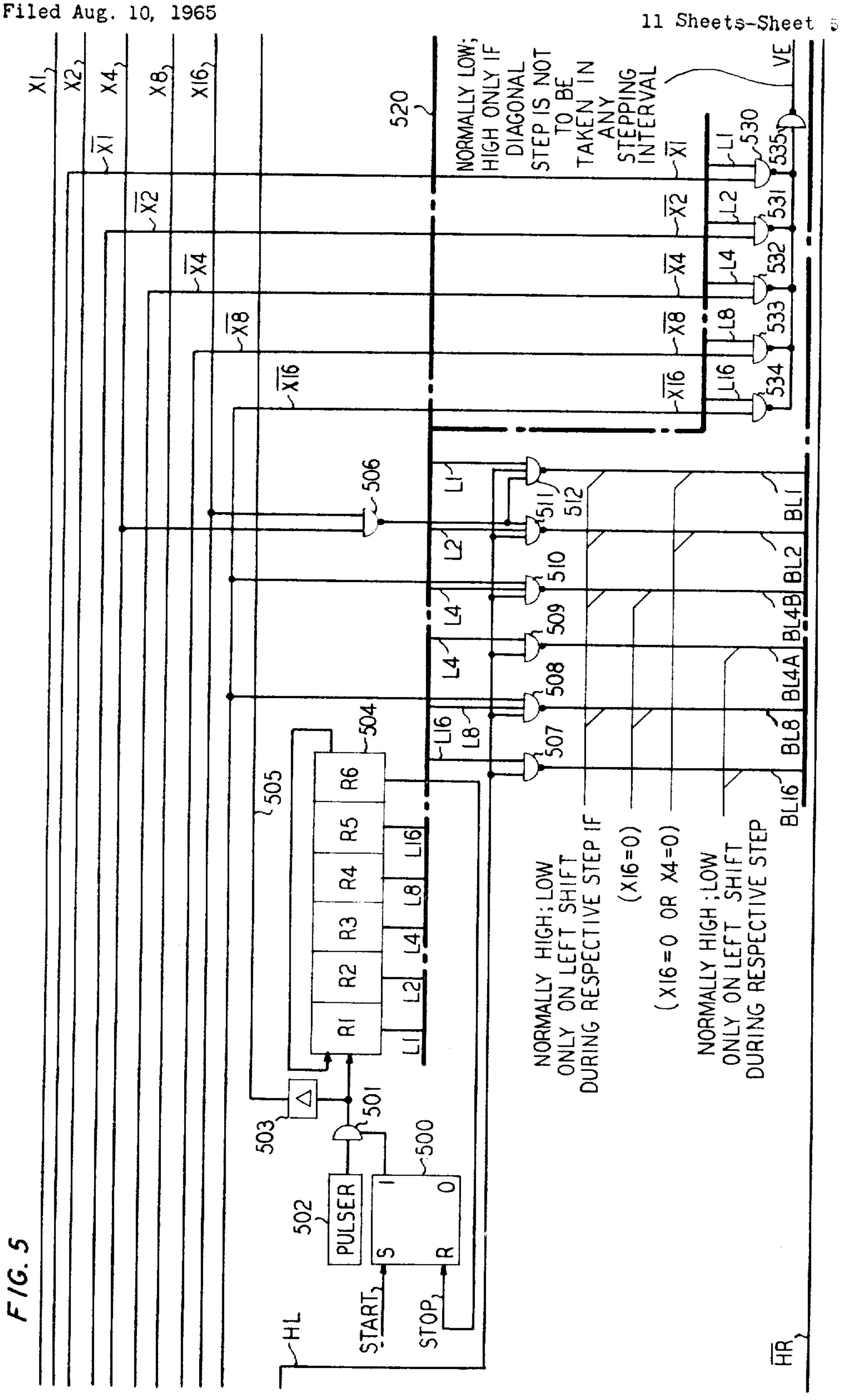
Figure 6:
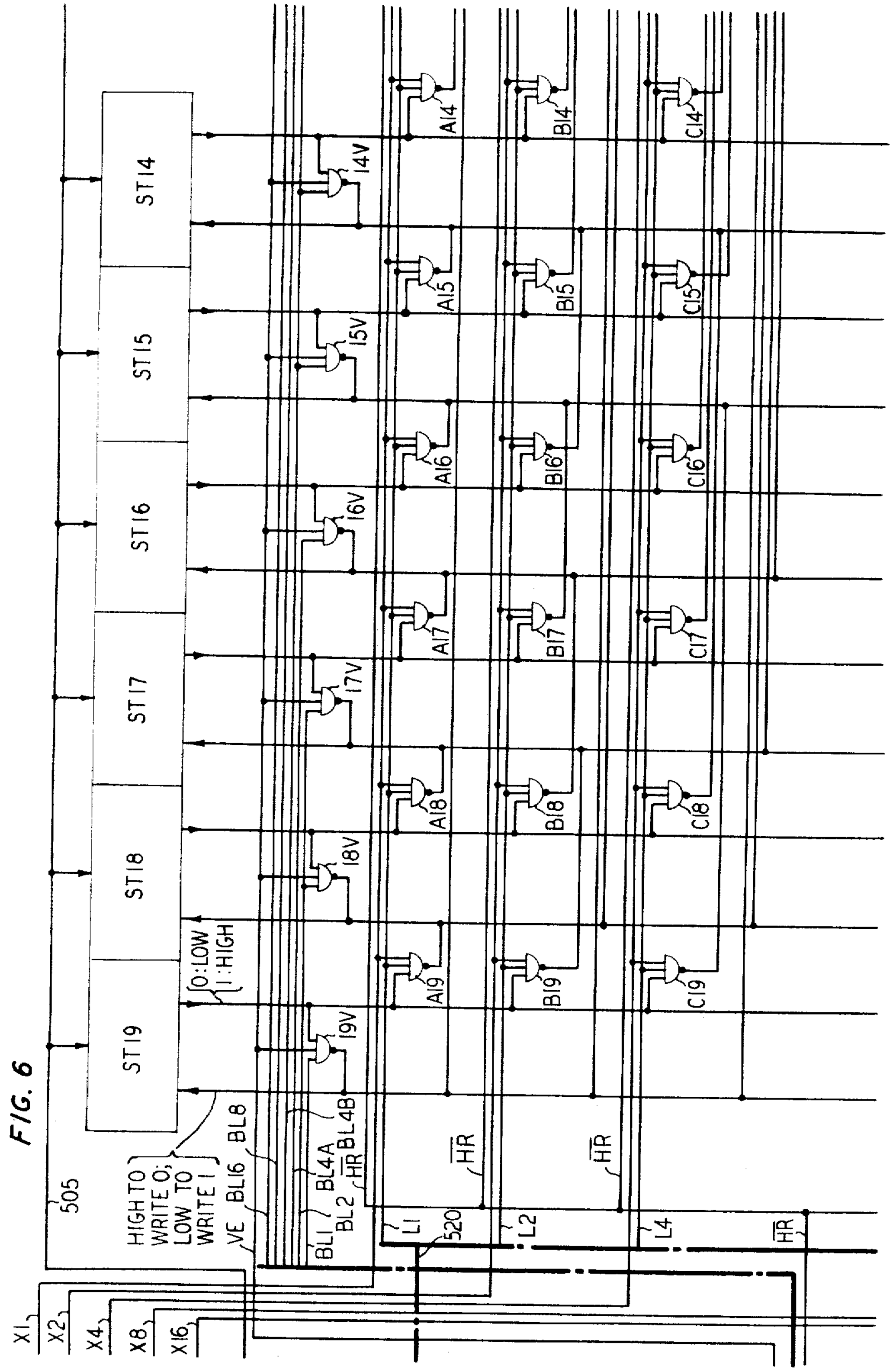
Figure 7:
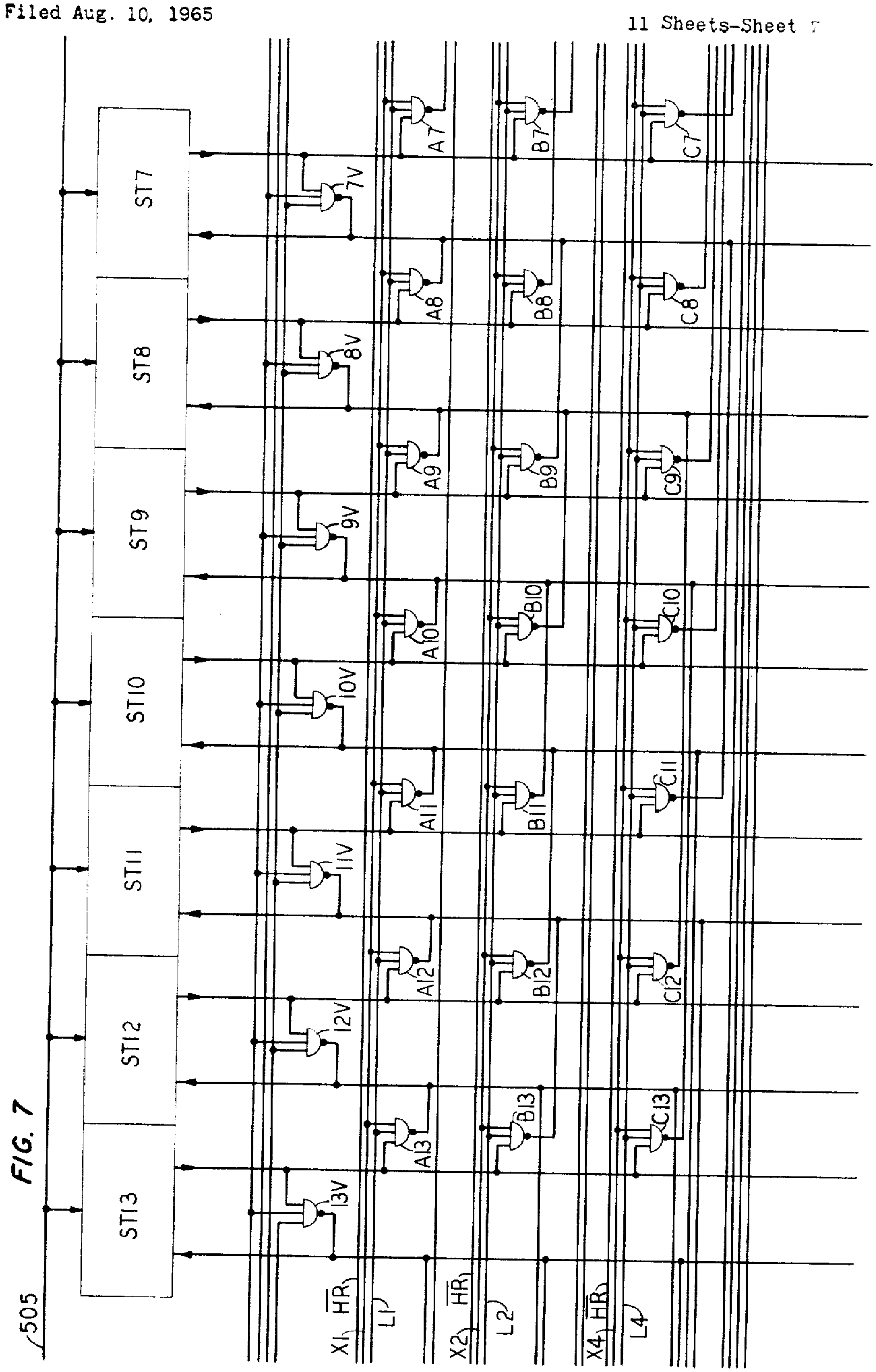
Figure 8:
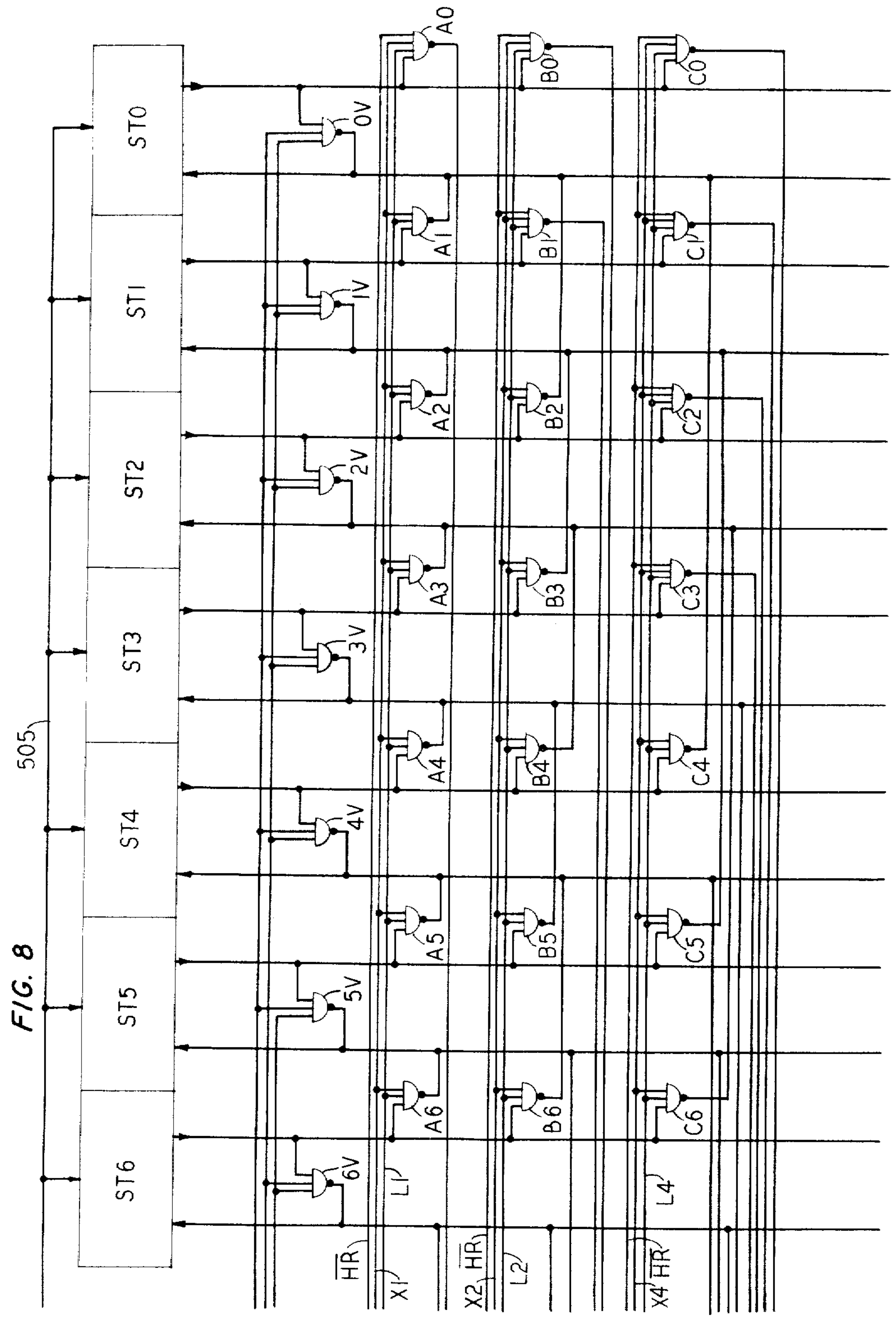
Figure 9:
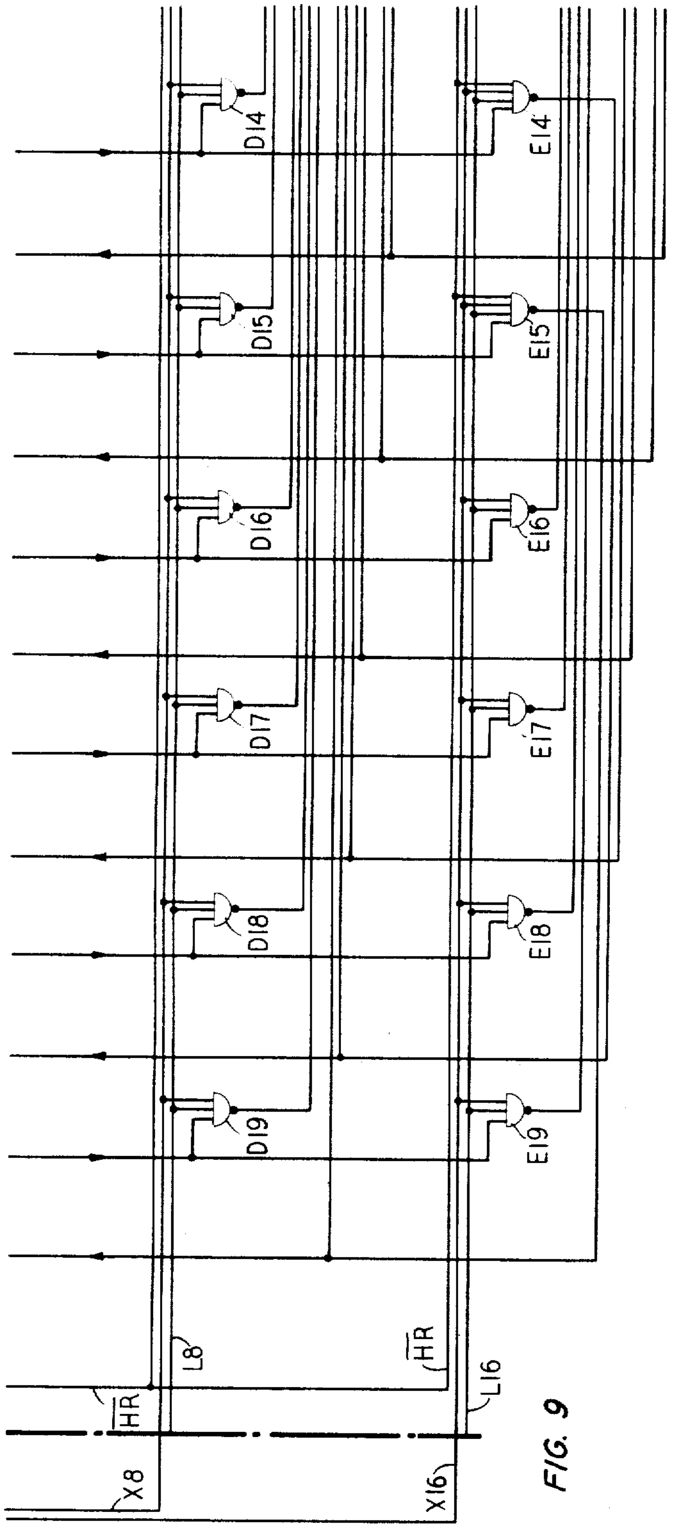
Figure 10:
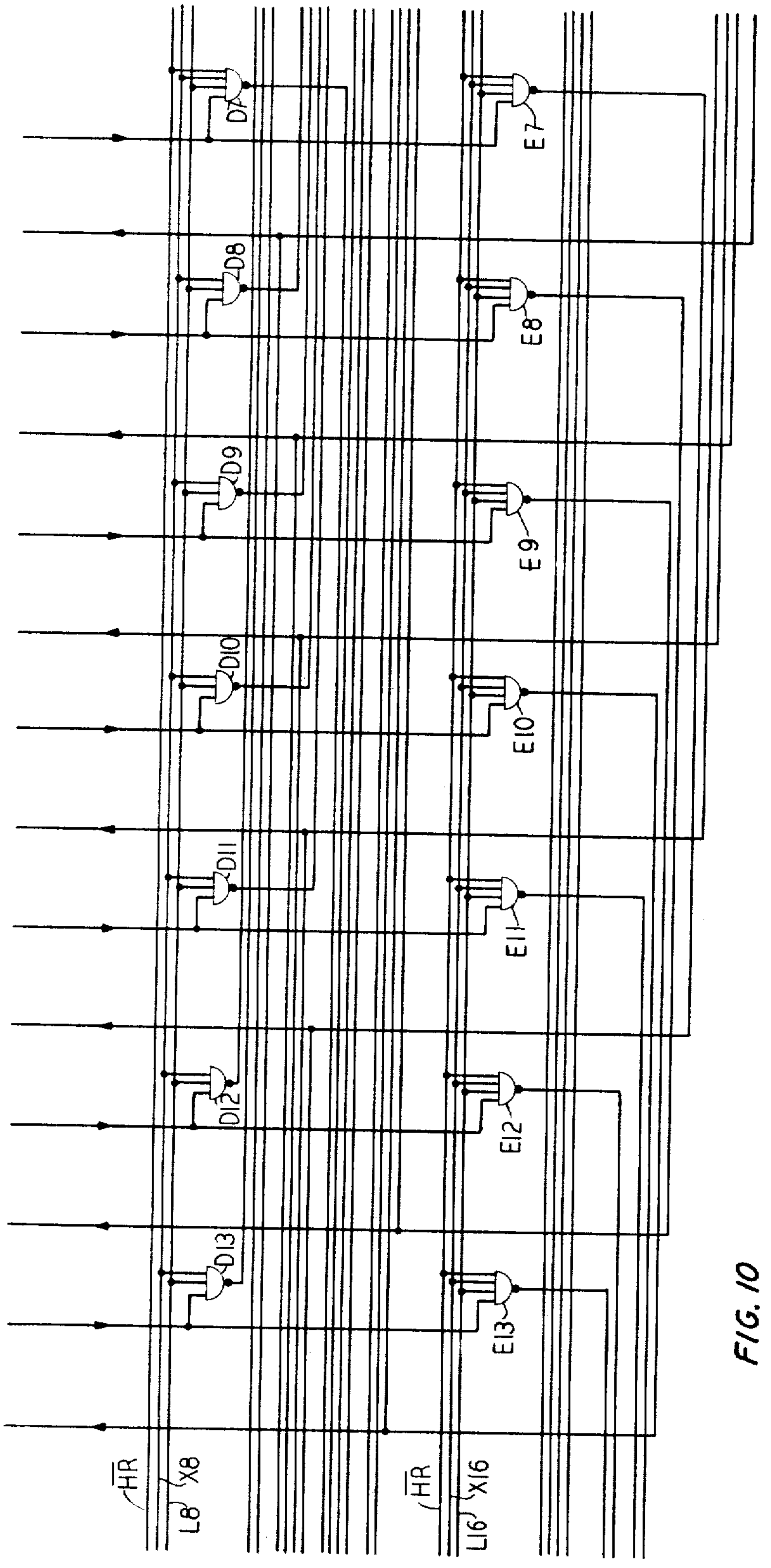
Figure 11:
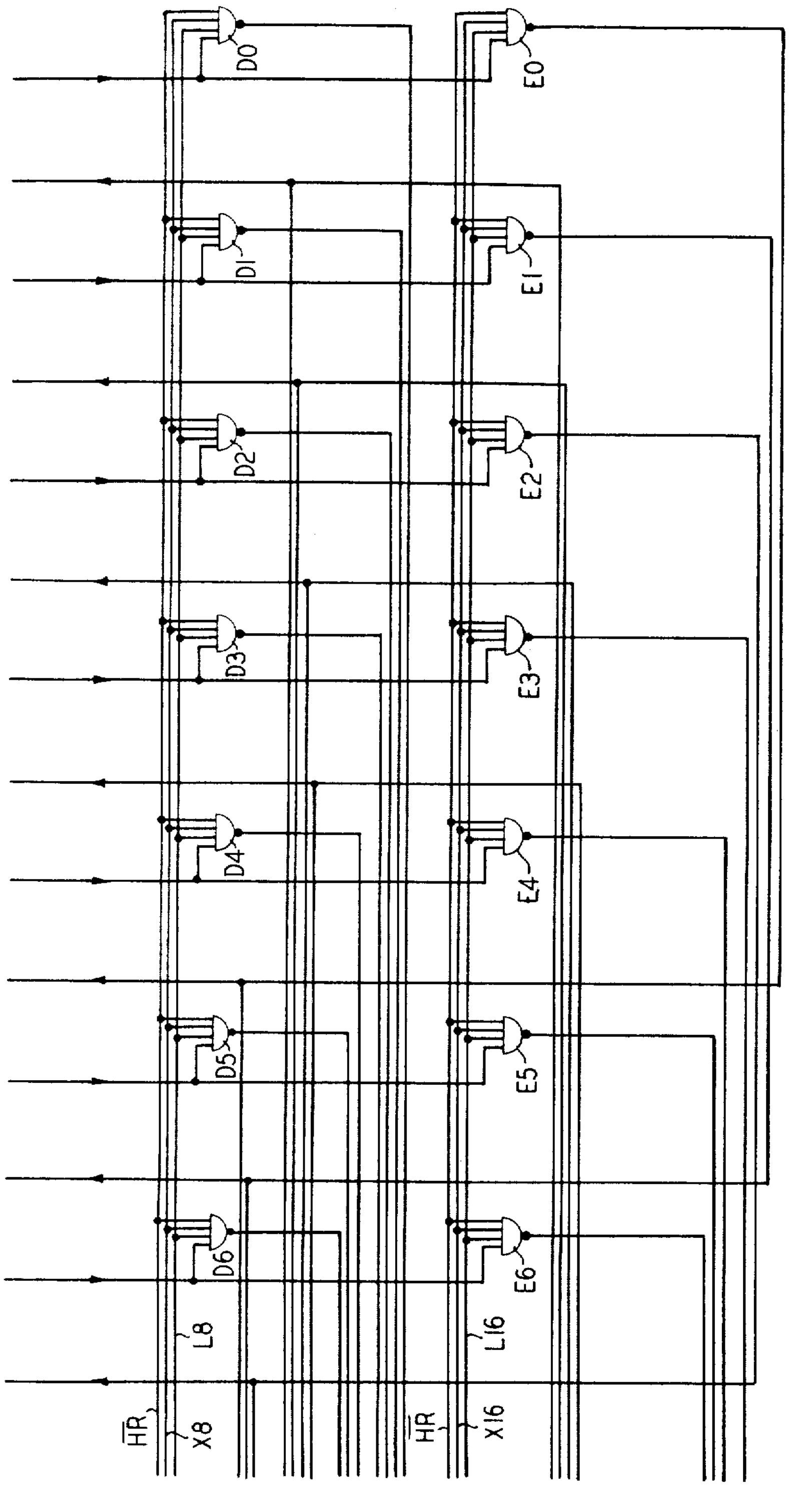

The detailed electronic 20-bit shift and rotate circuit, based on the network of FIG. 2, is shown in FIGS. 4–11, the arrangement of the figures being shown in FIG. 12. The 20-stage register comprising ST0 through ST19 is shown at the top of FIGS. 6–8. Directly beneath the register stages is the set of 20 vertical gates 0V–19V. FIGS. 6–8 also contain the three sets of diagonal gates A0–A19, B0–B19 and C0–C19, these three sets of diagonal gates controlling respectively shifts of 1, 2 and 4 positions to the right. FIGS. 9–11 contain the last two sets of diagonal gates D0–D19 and E0–E19, which control respectively shifts to the right of 8 and 16 positions. FIGS. 4 and 5 contain the control circuitry which governs the operations of the six sets of gates on FIGS. 6–11. The control circuitry determines which gates should operate at any instant to control the proper operation on the data word initially in the register. Additional circuitry, not shown, is used to first write a word in the register. The details of this circuitry are not necessary for an understanding of my invention.

Each stage is connected to an input bus and an output bus. If the stage represents a 0 the output bus is low in potential and if the stage represents a 1 the output bus is high in potential. To write a bit in a register stage the opposite potentials are required. Thus to write a 0 in a stage the input bus must be high in potential and to write a 1 the input bus must be low in potential. At the top of each stage there is a trigger lead connected to conductor 505. Once a bit appears in a register stage the stage is unaffected by the potential on the input bus. When a pulse appears on the trigger input however a new bit is written into the stage depending on the potential of the input bus. Once the trigger pulse terminates the potential on the input bus once again has no effect on the stage. The register stages ST0 through ST19 have sufficient internal delays in responding to the trigger that the output busses do not change value until after the trigger terminates.

There are six gates which terminate on each input bus. For example, consider stage 10. Gate 10V controls the potential on the input bus in accordance with the potential on the output bus. In other words gate 10V is the vertical gate which merely controls the rewriting of the bit in stage 10 of the register. Diagonal gate A11 is the gate in the first set which transmits the bit on the output bus of stage 11 to the input bus of stage 10 when a step of one position to the right is taken. Gate B12 is the diagonal gate in the second set which transmits a bit from the output bus of stage 12 to the input bus of stage 10 when the gates in the second set are operated. The gates in the third, fourth and fifth sets which are connected to the input bus of stage 10 are C14, D18 and E6. These three gates are the ones which connect the output busses of the stages 4, 8 and 16 positions to the left of stage 10 to the input bus of stage 10.

In the absence of any control signals none of the gates on FIGS. 6–11 is operated, i.e., the output potentials of all gates are high. Thus since the output potentials of the six gates connected to each input bus are high the input bus is also high in potential. In each step of an operation the 20 vertical gates or the 20 gates in any diagonal set are operated. Since only one gate connected to any input bus may be operated it is seen that the potential on the bus depends solely on the operation of this gate. The output potentials of the other five gates connected to the bus are high. If the gate operated in the step produces a high potential at its output the input bus remains high in potential and when the trigger pulse appears on conductor 505 a 0 is written in the stage. If the output of the operated gate is low in potential the potential of the input bus is low and when the trigger pulse appears on conductor 505 a 1 is written into the stage.

The control signals are derived on FIGS. 4 and 5. The commands transmitted to the control circuit are derived electronically but, since the derivation of these signals is not necessary for an understanding of the invention, the origination of the command signals is shown symbolically only at the left of FIG. 4. Conductors HR, HL, QR and QL are all normally low in potential. When any operation is to be performed only one of these conductors goes high in potential. The conductor which goes high is HR on a right shift, HL on a left shift, QR on a right rotate and QL on a left rotate operation. At the same time that a positive potential is applied to one of these four conductors to specify the type of operation to be performed, control potentials are applied to the five magnitude leads A1, A2, A4, A8 and A16. The potentials on these conductors represent five bits in a binary code which specifies the magnitude of the desired shift. This magnitude is the uncomplemented value and is the actual magnitude of the shift operation to be executed. The primary purpose of the circuitry on FIG. 4 is to derive the steering word which actually controls the shifting of the bits in the register.

The steering bits which control the shifting appear on conductors X16, X8, X4, X2 and X1. Leads $\overline{\mathbf{X16}}$, $\overline{\mathbf{X8}}$, $\overline{\mathbf{X4}}$, $\overline{\mathbf{X2}}$ and $\overline{\mathbf{X1}}$ carry the complements of the bits on the respective steering leads, the complemented bit values also being required to control the shifting. The five leads X16, X8, X4, X2 and X1 are at potentials identical to those on respective leads A16, A8, A4, A2 and A1 if the direction of the shift is to the right. However if a left shift or a left rotation operation is to be performed the steering word on leads X16–X1 is the complement of the shift magnitude on leads A16–A1, with respect to the decimal number 20. FIG. 4 includes the circuitry for complementing the input shift magnitude with respect to 20 if the direction of the shift is to the left.

Gates 401, 402, 403 and 404 serve as inverters since each of them has only one input. Since only one of conductors HR, HL, QR and QL is high the output of only one of the gates is low. Before any command is specified all four of leads HR, HL, QR and QL are low. All four outputs of gates 401–404 are high. Since both inputs of gate 405 and both inputs of gate 406 are normally high, the outputs of both gates 405 and 406 are normally low. When a left shift or rotate operation is to be performed one of the inputs of gate 406 goes low and consequently the output goes high. Similarly when a right shift or a right rotate operation is to be performed one of the inputs of gate 405 goes low and the output goes high. The outputs of gates 405 and 406 are thus dependent only on $\overline{X16}$, $\overline{X8}$, $\overline{X4}$, $\overline{X2}$ and $\overline{X1}$ are merely the complements of respective bits in the final shift magnitude word, the complemented bits also being required for control purposes.

Gates 407–417 and gates 430–434 serve to complement the input shift magnitude on leads A16–A1 with respect to the number 20 whenever the direction of the shift is to the left. The operation of these gates may be best understood upon analysis of the following table. The table gives the binary form for each of the decimal numbers 0–20. The complement of each of the numbers with respect to 20 is also given. At the right side of the table five columns are shown, one column for each of bits X16, X8, X2 and X1. A check in any column indicates that the respective bit is to be a 1 in order that the final steering word be the complement with respect to 20 of the input shift magnitude word.

| Decimal Number | Binary Form | Decimal Complemented Number With Respect to 20 | Binary Form | Bits in Complemented Binary Number which Are 1's | | | | |
|---|---|---|---|---|---|---|---|---|
| | | | | X16 | X8 | X4 | X2 | X1 |
| 0 | 00000 | 20 | 10100 | √ | | √ | | |
| 1 | 00001 | 19 | 10011 | √ | | | √ | √ |
| 2 | 00010 | 18 | 10010 | √ | | | √ | |
| 3 | 00011 | 17 | 10001 | √ | | | | √ |
| 4 | 00100 | 16 | 10000 | √ | | | | |
| 5 | 00101 | 15 | 01111 | | √ | √ | √ | √ |
| 6 | 00110 | 14 | 01110 | | √ | √ | √ | |
| 7 | 00111 | 13 | 01101 | | √ | √ | | √ |
| 8 | 01000 | 12 | 01100 | | √ | √ | | |
| 9 | 01001 | 11 | 01011 | | √ | | √ | √ |
| 10 | 01010 | 10 | 01010 | | √ | | √ | |
| 11 | 01011 | 9 | 01001 | | √ | | | √ |
| 12 | 01100 | 8 | 01000 | | √ | | | |
| 13 | 01101 | 7 | 00111 | | | √ | √ | √ |
| 14 | 01110 | 6 | 00110 | | | √ | √ | |
| 15 | 01111 | 5 | 00101 | | | √ | | √ |
| 16 | 10000 | 4 | 00100 | | | √ | | |
| 17 | 10001 | 3 | 00011 | | | | √ | √ |
| 18 | 10010 | 2 | 00010 | | | | √ | |
| 19 | 10011 | 1 | 00001 | | | | | √ |
| 20 | 10100 | 0 | 00000 | | | | | |

the direction of the shift, not the particular operation to be performed. The outputs of these two gates control the complementing of the input shift magnitude. No differentiation is made between shift and rotate operations because the complementing of the input shift magnitude is a function only of the shift direction, not the particular type of operation to be performed.

If the direction of the shift is to the right the output of gate 406 is low. Since the output of gate 406 is an input to each of gates 407–417 the outputs of these gates are all high. The outputs of various ones of these gates are tied together but since all of the outputs are high all of conductors 418–421 are high. These conductors are tied to the outputs of respective ones of gates 422–425 and since the four conductors 418–421 are all high the potentials applied to leads $\overline{X16}$, $\overline{X8}$, $\overline{X4}$ and $\overline{X2}$ are functions only of the operations of respective ones of gates 422–425.

One of the inputs of each of these four gates is connected to the output of gate 405 which is high on a right shift. The other input of each of these gates is connected to a respective one of leads A16, A8, A4 and A2. Consequently the output of each of these gates is the complement of the respective shift magnitude bit. Thus for example the potential on lead $\overline{X16}$ is the inverse of the potential on lead A16. Inverter 429 inverts the bit value on conductor $\overline{X16}$ and the output of this gate, X16, is the same as the value of bit A16. Similar remarks apply to gates 426, 427 and 428. Consequently on right shifts bits X16, X8, X4 and X2 are the same as the bits on leads A16, A8, A4 and A2. Lead X1 is connected directly to A1 and thus bit X1 is the same value as the least significant bit in the input magnitude word. Gate 430 inverts the value of the bit on lead A1 and, since the output of gate 430 is connected directly to conductor $\overline{X1}$, bit $\overline{X1}$ is the complement of bit X1. Thus when the direction of the shift is to the right the steering word (X16)(X8)(X4)(X2)(X1) is identical to the input shift magnitude. Bits The first thing to note in the table is that bit X1 is always the same as bit A1 even when the input shift magnitude is complemented with respect to 20. For this reason conductor X1 in FIG. 4 is connected directly to conductor A1. Conductor $\overline{X1}$ always contains the complement of bit X1 due to the inverting action of gate 430. The other four bits X16, X8, X4 and X2 are controlled in accordance with the operation of gates 407–417 and 430–434. The principles behind the design of the circuit are the following. The outputs of all of gates 422–425 are high because one of the inputs of each of these gates is connected to the output of gate 405 which is low when the direction of shift is to the left. Consequently the value of each of bits $\overline{X16}$, $\overline{X8}$, $\overline{X4}$ and $\overline{X2}$ is controlled by the potential of the respective one of conductors 418–421. Each of these conductors must go low when the respective complemented bit in the steering word is to be a 0, i.e., each of these conductors must go low when the respective one of bits X16, X8, X4 and X2 in the final magnitude word is to be a 1.

Consider first conductor 418 which controls the value of bit X16. As seen from the table this conductor must go low to control bit X16 to be a 1 when the input shift magnitude is 0, 1, 2, 3 or 4. The input shift magnitude is one of these values when A16, A8 and A4 are all 0's, or when A16, A8, A2 and A1 are all 0's. Three of the inputs of gate 417 are connected to the outputs of gates 434, 433 and 432. If bits A16, A8 and A4 are all 0's the outputs of these three gates are high and thus three of the inputs of gate 417 are high. When shifting is to the left the fourth input of gate 417, connected to the output of gate 406, is also high. Since all four inputs of gate 417 are high its output is low and conductor 418 is low as required. The other situation in which conductor 418 is to go low, when all of bits A16, A8, A2 and A1 are 0's, is controlled by gate 416. The input of this gate connected to the output of gate 406 is high when shifting is to the left. The other four inputs are connected to the outputs of gates 434, 433, 431 and 430 which are high when bits A16, A8, A2 and A1 are 0's. Consequently the output of gate 416 is low when bits A16, A8, A2 and A1 are all 0's to control bit X16 to be a 1.

Gates 412–415 control the potential of conductor 419 and the value of bit X8. The operations of these gates may be analyzed for each of the 20 possible input shift magnitudes. The outputs of all these gates are high unless the direction of shift is to the left and the input shift magnitude is one of the numbers 5–12. As seen from the table, bit X8 is to be a 1, i.e., conductor 419 is to go low, only when the input shift magnitude is one of the numbers 5–12. At least one of the outputs of gates 412–415 goes low when shifting is to the left and the input shift magnitude is one of the values 5–12. In a similar manner gates 409–411 control the value of bit X4 and gates 407 and 408 control the value of bit X2. The primary function of the circuitry in FIG. 4 is to derive the steering word (X16)(X8)(X4)(X2)(X1) which controls the paths taken by the data word in the network. The direction of the shift through the network is always to the right. If the input command to the system is to shift or rotate to the left the steering word which controls the actual shifting to the right is constructed to be the complement of the input shift magnitude with respect to 20.

In addition to the ten leads $\overline{X16}$–X1 which are extended from FIG. 4 to the remainder of the shift and rotate circuit, two leads HL, and $\overline{HR}$ are extended from FIG. 4 to the remaining figures. These two leads indicate whether either of the shift operations is to be performed. The circuitry in the remainder of the system requires no additional information. If the two leads HL and $\overline{HR}$ do not specify a shift operation, the input data word is rotated to the right. No further control for accomplishing a left rotate operation is required since the input shift magnitude is already complemented and automatically controls the left rotate operation even though the input data word is actually rotated to the right.

On FIG. 5 there is included a ring counter 504 having six stages R1–R6. It will be recalled that five steps are required to accomplish any operation. When output conductor L1 of stage R1 is high the first step, either vertical or diagonal, takes place. When output conductor L2 of stage R2 is high the second step, vertical or diagonal, takes place. Similar remarks apply to stages R3–R5 and output conductors L3–L5. Initially stage R6 is the stage of the counter which contains the 1 bit. After the various command signals are applied to the control circuit and the steering word is derived, a start pulse is applied to the S input of flip-flop 500. The flip-flop switches to the 1 state and gate 501 is enabled. Pulser 502 continuously operates but unless gate 501 is enabled the pulses are not transmitted to delay 503 and the shift input of ring counter 504. When the gate is enabled however with the application of the start pulse the pulses from pulser 502 operate both the delay and the counter. The first shift pulse applied to the counter causes the 1 bit in stage R6 to be fed back to stage R1. Consequently conductor L1 is high in potential and the first step takes place. Actually the energization of conductor L1 merely controls the derivation of the proper potential on each of the 20 input busses. The bits in the register stages are not affected until a trigger pulse is applied to conductor 505. The same pulse from pulser 502 which initially causes the energization of conductor L1 is transmitted through delay 503 to the trigger input conductor 505. The pulse is delayed in order that the proper potentials be derived on the 20 input busses before the new bits are written in the register stages. The second pulse from pulser 502 shifts the 1 bit from stage R1 to stage R2 of ring counter 504. Conductor L1 is de-energized and conductor L2 is energized to control the second step, again either vertical or diagonal. This process continues until finally the fifth pulse causes conductor L16 connected to the output of stage R5 to be energized. When the fifth pulse is transmitted through delay 503 the fifth step, either vertical or 16 positions to the right, is taken. At this time the shifted word appears in the register stages ST0 through ST19 and no further operations are required. The sixth pulse from pulser 502 causes the 1 bit in stage R5 to be shifted to stage R6. The output conductor from stage R6 is connected to the stop input R of flip-flop 500. When the flip-flop switches to the 0 state the 1 output goes low in potential and gate 501 is disabled. Consequently counter 504 is left with stage R6 energized in preparation for the next operation.

Various conductors are extended from FIG. 5 to FIGS. 6–11. Conductors X1, X2, X4, X8 and X16 are used to control the energizations of the diagonal gates in the respective sets. If conductor X8 for example is high in potential gates D1–D19 are operated to transmit the bits in respective stages to stages eight positions to the right. If conductor X8 is low in potential these diagonal gates are not operated during the fourth step of the operation since during this step the vertical gates are operated. Conductors L1, L2, L4, L8 and L16 are similarly extended via cable 520 to FIGS. 6–11. Each conductor is connected to all 20 gates in a respective set of diagonal gates. Only one of these conductors is high in potential in each of the five steps of the shifting operation and thus at most one of the five sets of diagonal gates may be operated in each step. The 20 gates in the set are operated however only if the respective one of conductors X1–X16 is high in potential.

The remaining circuitry on FIG. 5 derives the control signals for the 20 vertical gates 0V–19V. Consider first the six gates 530–535. The output of gate 535 is connected to an input of each of the 20 vertical gates. The output of gate 535 is normally low in potential in order that the output of each of the vertical gates be high. Unless a vertical step is to be taken the output of each vertical gate should be high in potential in order that the potential on the respective input bus be determined by the operated one of the five diagonal gates connected to the bus. The output of gate 535 goes high in potential during a stepping interval only if a vertical step is to be taken during this interval. Thus for example if the shift magnitude represented on conductors X16–X1 is the binary number 01011, vertical steps are to be taken during the third and fifth stepping intervals and the output of gate 535 remains low except during stepping intervals 3 and 5 when it goes high.

The operation of gate 535 is controlled by the outputs of gates 530–534. Conductors L1–L16 are each connected to an input of a respective one of these gates. Since initially each of these conductors is low in potential the outputs of all five gates are high and the output of gate 535 is low. During the first stepping interval conductor L1 is high in potential. If conductor $\overline{\textbf{X1}}$ is high in potential, i.e., the vertical gates are to be operated during the first stepping interval, both inputs to gate 530 are high and the output goes low. Consequently the output of gate 535 goes high to control the operation of the vertical gates. If a diagonal step is to be taken during the first stepping interval conductor $\overline{\textbf{X1}}$ is low in potential, the output of gate 530 remains high and the output of gate 535 remains low. Similar remarks apply to gates 531–534 which control the operation of gate 535 during the respective stepping intervals two through five. The output of gate 533, for example, goes low only during the fourth stepping interval when conductor L8 is high in potential if conductor $\overline{\textbf{X8}}$ is also high. In such a case the vertical step is to be taken and conductor 535 goes high.

To accomplish right rotation no blocking signals are required. Similarly, to accomplish left rotations no blocking signals are required; once the complemented shift magnitude is derived the ordinary right rotation takes place. A blocking signal is required however on right shifts to block the diagonal gates which control the transfer of bits from stages at the right end of the register to stages at the left end. Conductor $\overline{HR}$ is high in potential on right shifts and this conductor is extended to FIGS. 6–11 to control the blocking of the diagonal gates as will be described below. On left shifts some of the vertical gates must be blocked. The vertical gate blocking signals are derived by gates 506–512 and appear on conductors BL1, BL2, BL4A, BL4B, BL8 and BL16.

Consider first the blocking signal on conductor BL16. Referring to FIG. 2 it is seen that the vertical paths between nodes 0E and 0F through 4E and 4F must be blocked during the fifth stepping interval. That is, the five vertical gates 0V through 4V must automatically control the writing of 0's in stages 0 through 4 if X16 is a 0. If X16 is a 0 the five diagonal gates connected to the input bus for each of stages 0 through 4 are unoperated and their outputs are high. The potentials on the input busses are determined solely by the vertical gates and if the outputs of the five vertical gates are high the input busses will be high in potential and 0's will be written in the first five stages of the register. Conductor BL16 is connected to one input of each of gates 0V through 4V and if this conductor goes low during the fifth stepping interval 0's will be written in the first five stages as required. Conductor BL16 is normally high in potential since both conductors L16 and HL, the inputs to gate 507 are low. During the fifth stepping interval conductor L16 is high in potential. If conductor HL is high in potential, i.e., a left shift is being performed, the output of gate 507 goes low and the outputs of vertical gates 0V through 4V are held high. Of course, if a diagonal step is being taken during the fifth stepping interval the outputs of these five gates, as well as the outputs of the remaining vertical gates, are held high in order that the potentials on the input busses be determined solely by the bit signal transmitted through the one operated diagonal gate connected to each input bus. However, if vertical steps are being taken, the only gates which can operate are the vertical ones and if the outputs of gates 0V through 4V are held high by the low potential on blocking conductor BL16 the input busses are high in potential; 0's are automatically written into the first five stages independent of the bit values initially in these stages.

Referring to FIG. 2 it is seen that during the fourth stepping interval the vertical gates connected to stages 5 through 12 must be blocked, i.e., even if vertical steps are taken the outputs of gates 5V through 12V must be held high in order that 0's automatically be written in stages 5 through 12 of the register, if X8 is a 0. However as described above the blocking is only conditional. These gates must be blocked only if the bits in stages 5 through 12 cannot cross the line L—L during the fifth step. Consequently while blocking conductor BL8 must go low during the fourth stepping interval when conductor L8 is high in potential if conductor HL is high, the blocking conductor should go low only if X16 is a 0. For this reason gate 508 has three inputs, L8, HL and $\overline{\textbf{X16}}$. If X16 is a 1, $\overline{\textbf{X16}}$ is a 0 and the output of gate 508 is high since the vertical gates connected to stages 5 through 12 should not be blocked. But if $\overline{\textbf{X16}}$ is a 1 indicating that the bits in stages 5 through 12 will not cross the line L—L during the fifth stepping interval, the three inputs to gate 508 are high and conductor BL8 goes low in potential during the fifth stepping interval.

Referring to FIG. 2 it will be recalled that when the step of four positions is to be taken transmission path 16C–16D must be blocked unconditionally, while transmission paths 13C–13D through 15C–15D must be blocked only if X16 is a 0 since bits transmitted down these three vetrical paths will be the transmitted across line L—L when the diagonal step of 16 positions is taken. Gate 509 is used to derive blocking signal BL4A. Conductor BL4A goes low in potential unconditionally when conductors L4 and HL are high in potential. Conductor BL4A is connected to one input of gate 16V and on left shifts during the fourth stepping interval the bit in stage 16 of the register is automatically changed to a 0. Gate 510 is used to derive blocking signal BL4B. The inputs to this gate are the same as those for gate 509 except that an additional input $\overline{\textbf{X16}}$ is provided. Consequently conductor BL4B goes low during the third stepping interval of a left shift only if X16 is a 0. This blocking signal is an input to each of gates 13V through 15V. On a left shift operation, during the third stepping interval, the outputs of these gates are forced high only if X16 is a 0.

Referring again to FIG. 2 it will be recalled that on left shifts vertical paths 17B–17C and 18B–18C must be blocked only if X16 or X4 is a 0. If at least one of these bits is a 0 a bit transmitted down the two vertical paths cannot possibly cross line L—L by the time the shift is over. Consequently, blocking conductor BL2 which is connected to vertical gates 17V and 18V must go low in potential on left shifts during the second stepping interval only if at least one of bits X4 and X16 is a 0. Two of the inputs to gate 511 are the L2 and HL signals. These signals are both high during the second stepping interval of a left shift. The third input to the gate is the output of gate 506. The two inputs to this gate are bits X4 and X16. If either of bits X4 and X16 is a 0 the output of gate 506 is high, and since all three inputs of gate 511 are high blocking signal BL2 goes low. Blocking signal BL2 is a conditional signal. It goes low during the second stepping interval of a left shift only if at least one of bits X4 and X16 is a 0. If both bits are 1's the output of gate 506 is low and blocking signal BL2 remains high in order that vertical gates 17V and 18V not be blocked automatically.

The last dotted vertical path in FIG. 2 to consider is 19A–19B. This path is one of the five vertical paths corresponding to gate 19V. As described above the path is blocked conditionally during the first stepping interval of a left shift. It is blocked only if at least one of bits X4 and X16 is a 0. The three inputs to gate 512 are L1, HL and the output of gate 506. The conditional factor is the same as that for the two vertical paths 17B–17C and 18B–18C and consequently gate 506 is connected to an input of each of gates 511 and 512.

Attention may now be directed to the gating connections on FIGS. 6–11. Of the six sets of 20 gates each only one set is operated in any stepping interval. Each of the gates in set A has as one of its inputs the L1 signal. Each of the B gates has as one of its inputs the L2 signal. Similar remarks apply to the C, D and E sets of diagonal gates and the respective L4, L8 and L16 signals. Consequently in any stepping interval at most one of the five sets of diagonal gates can be operated, i.e., the outputs of the gates in at most one of the sets can go low to control the writing of 1's in the respective stages.

A particular set of diagonal gates must operate during the respective stepping interval only if the diagonal step is to be taken during that interval. Whether the diagonal step is to be taken is determined by the respective one of the five bits X1 through X16. The X1 signal is one of the inputs to each of the diagonal gates in set A, the X2 signal is one of the inputs to each of the diagonal gates in set B, the X4 signal is an input to each of the diagonal gates in set C, etc. Consider for example gates C0 through C19. Each of these gates has an L4 input and an X4 input. During the first, second, fourth and fifth stepping intervals L4 is low and the output of each of the 20 gates is held high in order that these gates assert no control over the input busses. During the third stepping interval L4 is high and the 20 diagonal gates are not inhibited from operating. However if X4 is a 0 these gates should be inhibited since the diagonal step of 4 is not to be taken. If X4 is a 0 the output of each of the 20 gates is held high and again the gates assert no control on the potentials of the input busses. Only if a diagonal step of 4 is to be taken are both the L4 and X4 signals high during the third stepping interval. At this time neither of the two signals forces the outputs of the gates high and the gates operate in accordance with the remaining inputs.

Each of the 100 diagonal gates, in addition to one of the L inputs and one of the X inputs, has an input connected to the output bus of a respective stage. Some of the diagonal gates have a fourth input $\overline{HR}$, which for the moment will be neglected. If the first two inputs to any of the gates is high the output is determined solely by the third input. If the third input, which is connected to an output bus, is also high in potential the output goes low. On the other hand, if the third input is low in potential the output remains high even though the other two inputs are high. It will be seen that when one of the diagonal gates operates the signal transmitted through it is inverted. When the first two inputs are high in potential the output potential will be opposite to that of the third input, connected to an output bus. It is for this reason that the potentials representing 0's and 1's on the output busses are opposite to the potentials required on the input busses for writing these bits into the register stages.

Consider an illustrative diagonal gate C9. During the third stepping interval if X4 is a 1 the outputs of the 20 vertical gates and the diagonal gates in the A, B, D and E series are all high. Consequently, of the six outputs connected to the input bus for stage 5, the outputs of gates 5V, A6, B7, C9, D13 and E1, all are high except the output of gate C9 which may go low. If this output is low the input bus for stage 5 is also low. During the third stepping interval conductor L4 is high and asserts no control over gate C9. Since the diagonal step is to be taken conductor X4 is also high in potential and asserts no control over gate C9. The third input to the gate is connected to the output bus of stage 9. If stage 9 contains a 0 the output bus is low in potential, and the output of gate C9 remains high. Since all six gates connected to the input bus for stage 5 have high outputs the potential of the bus is high and a 0 is written into the stage. Thus the 0 in stage 9 is shifted to stage 5. On the other hand, if stage 9 contains a 1 its output is high. Since all three inputs to gate C9 are high the output goes low to force the input bus of stage 5 to ground. Since the input bus is low a 1 is written into stage 5.

All of the other diagonal gates operate in a similar manner except that some of the gates have $\overline{HR}$ inputs. It will be recalled that on right shifts bits shifted across the line L—L on FIG. 2 should not be reinserted in the left end of the register. Of the 20 diagonal gates in set A the $\overline{HR}$ input is connected to only gate A0. This is the only gate in the set which may cause a bit to cross the line L—L, i.e., to be reinserted in the left end of the register. Thus on a right shift when $\overline{HR}$ is a 0 the output of the gate A0 is held high independent of the value of the bit in stage 0 and the potential of its output bus. Since the output of gate A0 is high the input bus for stage 19 is also high in potential (the other four diagonal gates which terminate at this input bus do not operate during the first stepping interval, and vertical gate 19V does not operate if X1 is a 1) and a 0 is written in the stage when a trigger pulse appears on conductor 505. Of the gates in set B only gates B1 and B0 can transmit bits to stages (19 and 18) at the left end of the register. Consequently the $\overline{HR}$ signal is applied as a fourth input to both of these gates in order that they be blocked on right shifts. Similar remarks apply to the rightmost gates in the C, D and E sets. The $\overline{HR}$ blocking signal is an input to the four rightmost diagonal gates in set C, the eight rightmost diagonal gates in set D, and the 16 rightmost diagonal gates in set E.

The vertical gates 0V through 19V may now be considered. Each gate has three inputs. A first input is connected to the output bus of the respective stage. If the other two inputs of the gate are high in potential the ouput of the gate, connected to the input bus of the same stage, is opposite to the potential on the output bus and will cause the same value bit to be rewritten in the stage. The potential on the output bus is determined solely by the vertical gate because when the vertical gates operate the outputs of the 100 diagonal gates remain high. The second input to each of the vertical gates is the output of gate 535. This conductor is normally low in potential to hold the outputs of the 20 vertical gates high. The vertical enabling conductor VE goes high in potential to enable the vertical gates to operate only when a vertical step is to be taken. It will be recalled that the output of gate 535 is normally low. The output remains low during any stepping interval when a diagonal step is to be taken in order that the outputs of the vertical gates to be held high to thereby assert no control on the potentials of the respective input busses. In any stepping interval when a vertical step is to be taken however, the VE signal is high. Thus the vertical gates may operate depending on the other inputs to the gates.

The third input to each of the vertical gates is one of the blocking signals. Without these blocking signals, which do not exist for example during both rotation operations and right shifts, the operation of each vertical gate would be determined solely by the potential of the respective output bus. During left shifts some of the vertical gates must be blocked, i.e., their outputs must be held high in order that 0's be written into the respective stages. As described above the various blocking signals BL1 through BL16 are connected to the respective vertical gates which must be controlled to automatically write 0's in the respective stages during left shifts. While the blocking signals are normally high and assert no control, during a left shift if a vertical path on FIG. 2 is to be blocked, the blocking signal applied to the respective vertical gate is low and causes the output to go high independent of the potential of the respective output bus. Since the input bus is thus held at a high potential a 0 is written in the respective stage. As described above blocking signal BL1 is connected to an input of gate 19V, blocking signal BL2 is connected to inputs of gates 17V and 18V, blocking signal BL4A is connected to an input of gate 16V, blocking signal BL4B is connected to inputs of gates 13V through 15V, blocking signal BL8 is connected to inputs of gates 5V through 12V, and blocking signal BL16 is connected to inputs of gates 0V through 4V. The blocking signals are effective only during left shifts, when they may go low during the respective stepping intervals.

Each of the vertical gates, in addition to a bit input from a respective stage, has two inputs. The VE signal applied to each of the vertical gates enables the entire group of gates to be operated as opposed to the operation of one of the five groups of diagonal gates. Even if the VE signal enables the vertical gates to operate, however, particular gates may still be blocked depending on the respective blocking signals. By blocking the vertical gates in the manner described it is possible to accomplish left shifts with the use of right rotation circuitry.

Although the invention has been described with reference to a specific embodiment it is to be understood that the above-described arrangement is merely illustrative of principles of the invention. (For example, instead of providing vertical gates the blocking signals used on left shifts may directly control the writing of 0's in the respective stages.) Numerous modifications may be made therein and other arrangements may be devised without departing from the spirit and scope of the invention.

What is claimed is:

1. An arrangement for selectively shifting and rotating the bits of an $n$ bit data word in a specified one of two directions by any specified number of bit positions between 0 and $n$ comprising a register having $n$ stages containing the respective bits of said $n$ bit data word;

means for rotating the bits in said register in a first of said directions by said any specified number $m$ of register stages, said rotating means inserting bits shifted out of one end of said register into the other end of said register;

means for determining for each one of said $n$ register stages from said specified number $m$ and from the position of said one register stage with respect to the other stages of said register if the bit contained in said one register stage is significant, a significant bit being one which will be shifted out of said one end of said register and inserted in said other end of said register during a rotation of said bit in said first direction by said specified number $m$ of register stages;

and means controlled by said determining means during operation of said rotating means for writing a 0 into each said register stage determined to contain other than a significant bit to accomplish a shift of said $n$ bits in the other of said directions by $(n-m)$ register stages.

2. An arrangement in accordance with claim 1 wherein said writing means comprises a group of write gates for reinserting each one of said bits into the same register stage containing said one bit and means controlled by said determining means for inhibiting reinsertion of bits into register stages determined to contain other than a significant bit;

and said rotating means comprises a maximum of $(n-2)$ groups of rotate gates, each said rotate gate group for rotating said bits in said register in said first direction by a number of register stages unique to said group, means for selecting those of said rotate gate groups to be enabled in accordance with said specified number $m$, and means controlled by said selecting means for sequentially enabling said selected rotate gate groups in a predetermined sequence and for enabling said write gate group as a substitute in said predetermined sequence for each nonselected one of said rotate gate groups.

3. An arrangement in accordance with claim 2 wherein said determining means controls said inhibiting means during each enablement of said write gate group in accordance with the total of said register stage numbers unique to said rotate gate groups whose enablement can follow said enablement of said write gate group in said predetermined sequence.

4. An arrangement in accordance with claim 1 further comprising means controlled by said determining means for writing a 0 into each said register stage determined to contain a significant bit to accomplish a shift of said bits in said first direction by $m$ register stages.

5. An arrangement for selectively shifting the bits of an $n$ bit data word in a first direction by any specified number $m$ of bit positions between 0 and $n$ comprising a register having $n$ register stages for storing the respective $n$ bits of said data word;

a plurality of groups of $n$ gates, each of said $n$ gates of each said gate group connected to said register stages and operative for rotating said $n$ stored bits in a second direction opposite to said first direction by a number of register stages unique to said gate group, said plurality including a maximum of $(n-1)$ gate groups and comprising one gate group for which said unique number is 0;

and control means comprising operating means controlled in accordance with said any specified number $m$ for sequentially operating selected gate groups to rotate said stored bits in said second direction, and means controlled in accordance with said any specified number $m$ for inhibiting selected gates in said one gate group during operation of said one gate group.

6. An arrangement in accordance with claim 5 wherein said control means comprises means for deriving from said any specified number $m$ a complementary number $(n-m)$ and for controlling said operating means selectively to operate said gate groups to rotate said $n$ stored bits in said second direction by said complementary number $(n-m)$ of register stages.

7. An arrangement in accordance with claim 6 wherein said control means comprises selecting means for selecting each one of said selected gates in said one gate group in accordance with said any specified number $m$ and with the bit position of the register stage to which said one of said gates in said one gate group is connected.

8. An arrangement in accordance with claim 6 wherein said control means comprises selecting means for selecting each one of said selected gates in said one gate group in accordance with the bit position of the register stage to which said one of said gates in said one gate group is connected, with said unique numbers of said selected gate groups, and with the order in which said selected gate groups are sequentially operated.

9. An arrangement in accordance with claim 6 wherein said control means comprises means for determining for each one of said $n$ register stages from said specified number $m$ and from the position of said one register stage with respect to the other stages of said register if the bit contained in said one register stage is significant, a significant bit being one which will be rotated out of one end of said register into the other end of said register during a rotation of said bit in said second direction by said complementary number $(n-m)$ of register stages, and said selected gates in said one gate group comprise gates connected to those register stages determined to contain other than a significant bit.

10. An arrangement in accordance with claim 5 for selectively shifting said bits of said $n$ bit data word in said second direction by any said specified number $m$ between 0 and $n$ wherein said control means comprises means for inhibiting selected gates in only said selected gate groups for which said unique number is other than 0 during operation thereof.

11. A shift and rotate circuit for controlling the shifting of the $n$ bits contained in the $n$ stages of a register comprising a plurality of groups of $n$ unidirectional transmitting means, there being a maximum of $(n-2)$ groups in said plurality, one end of each transmitting means in each group being connected to a respective one of said stages, the other end of each transmitting means in each group being connected to another respective one of said stages such that all transmitting means in each group are connected between stages which are separated from each other by the same number of intermediate stages; an additional group of transmitting means each for transmitting the bit contained in a respective one of said stages back to said stage; means for enabling the operation of all of the transmitting means in any one of said groups simultaneously to transmit bits to the respective stages; means for sequentially energizing said enabling means in accordance with the total number of positions which the bits in said register stages are to be shifted; and means for inhibiting selected ones of the transmitting means in only said additional group to accomplish a shift operation in the direction opposite to that in which the transmitting means in the groups in said plurality are operative.

12. A shift and rotate circuit for controlling the shifting and rotating in either direction of the bits contained in the stages of a register comprising means for controlling the rotation of bits in a first direction in said register, means for controlling said rotating means to rotate the bits in said register a number of positions equal to a specified shift magnitude if the bits in said register are to be shifted or rotated in said first direction and for controlling said rotating means to rotate the bits in said register a number of positions equal to the complement of said specified shift magnitude with respect to the number of said stages if the bits in said register are to be shifted or rotated in the second direction, means for inhibiting the reinsertion of bits rotated out of one end of said register into the other end of said register when a shift operation in said first direction is to be performed, and means for selectively writing a 0 in each of said stages when the bit in said each stage cannot be rotated out of said one end of said register when a shift operation in said second direction is to be performed.

13. A shift and rotate arrangement comprising a register having a plurality of stages arranged in a numerically ordered sequence for storing the respective bits of a data word, said sequence being re-entrant from the last said register stage to the first said register stage;

a plurality of groups of transfer circuits, there being a maximum of two less transfer circuit groups in said plurality than there are stages in said register, each said transfer circuit in each said group of said plurality being connected between the output of one said register stage and the input of another said register stage separated from said one register stage in said re-entrant sequence order by a number of said register stages unique to the transfer circuit group including said transfer circuit, the interstage separation being different for each said group of transfer circuits;

an additional transfer circuit group wherein each transfer circuit is connected between the output of one said register stage and the input of the same said one register stage;

a control circuit for selectively and sequentially controlling said transfer circuit groups in accordance with received command signals specifying shift and rotate operations, their magnitudes and their directions to transfer bits between said register stages through said transfer circuit groups in a first direction;

said control circuit comprising complementing means responsive to received command signals which specify shift and rotate operations opposite in direction to said first direction for generating modified command signals defining the complement of the operation magnitude specified by said received command signals, and energizing means responsive to received command signals specifying shift operations opposite in direction to said first direction and controlled in accordance with said modified command signals for generating transfer circuit control signals which selectively and sequentially energize said transfer circuit groups and which cause certain of said transfer circuits selected in accordance with said modified command signals to transmit binary 0's when energized regardless of the present value of the bits in the register stages to whose output said selected certain transfer circuits are connected.

14. A shift and rotate arrangement in accordance with claim 13 wherein said control circuit comprises selecting means for controlling said energizing means and comprising means for determining for each said one of said register stages from said modified command signals and from the relative position of said one register stage in said re-entrant sequence order if the bit contained in said one register stage is insignificant, an insignificant bit being a bit which will be placed in a register stage numerically beyond the register stage in which the bit originally was contained and numerically preceding said first register stage in said re-entrant sequence order during said selective and sequential energizing of said transfer circuit groups;

and said selected certain transfer circuits comprise those transfer circuits in said additional transfer circuit group which are connected to register stages determined to contain insignificant bits.

15. A shift and rotate arrangement in accordance with claim 13 wherein said control circuit comprises sequence means responsive to said modified command signals for controlling said energizing means selectively to energize each of said plurality of transfer circuit groups a maximum of once during each complete shift and rotate operation in a predetermined sequence and selectively to energize said additional transfer circuit group as a substitute in said predetermined sequence for each of said plurality of transfer circuit groups not energized during said each complete shift and rotate operation.

16. A shift and rotate arrangement in accordance with claim 15 wherein said control circuit comprises selecting means for controlling said energizing means and comprising means for determining during each said selective energization of said additional transfer circuit group those of said register stages which contain insignificant bits from said modified command signals, the relative position of each register stage in said re-entrant sequence order and the total interstage separation provided by the transfer circuit groups remaining to be energized in said predetermined sequence;

an insignificant bit being a bit which will be placed in a register stage numerically beyond the register stage in which the bit originally was contained and numerically preceding said first register stage in said re-entrant sequence order during said selective and sequential energizing of said transfer circuit groups;

and said energizing means being controlled by said selecting means during each selective energization of said additional transfer circuit group as a substitute in said predetermined sequence to cause those transfer circuits in said additional transfer circuit group which are connected to register stages determined to contain insignificant bits to transmit binary 0's.

References Cited

UNITED STATES PATENTS

| | | | |
|---|---|---|---|
| 3,076,181 | 1/1963 | Newhouse et al. | 340—174 |
| 3,192,363 | 6/1965 | MacSorley | 235—164 |
| 3,193,808 | 7/1965 | Sanders | 340—174 |
| 3,210,737 | 10/1965 | Perry et al. | 340—172.5 |
| 3,229,080 | 1/1966 | Ward | 340—172.5 |
| 3,238,377 | 3/1966 | Seeber | 235—176 |
| 3,258,584 | 6/1966 | Buchholz et al. | 235—164 |
| 3,274,556 | 8/1966 | Paul et al. | 340—172.5 |

OTHER REFERENCES

Paul, G. T., et al.: Column Shifter. In IBM Technical Disclosure Bulletin, 4(10): pp. 79–80, March 1962.

ROBERT C. BAILEY, *Primary Examiner.*

J. P. VANDENBURG, *Assistant Examiner.*